United States Patent
Sinha et al.

(10) Patent No.: US 12,081,677 B2
(45) Date of Patent: *Sep. 3, 2024

(54) SYSTEM, METHOD, AND COMPUTER PROGRAM PRODUCT FOR SECURE REAL-TIME N-PARTY COMPUTATION

(71) Applicant: Visa International Service Association, San Francisco, CA (US)

(72) Inventors: Rohit Sinha, Bokaro Steel (IN); Ranjit Kumar Kumaresan, Sunnyvale, CA (US); Sivanarayana Gaddam, Santa Clara, CA (US); Mihai Christodorescu, Belmont, CA (US); Srinivasan Raghuraman, Cambridge, MA (US)

(73) Assignee: Visa International Service Association, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/461,857

(22) Filed: Sep. 6, 2023

(65) Prior Publication Data

US 2023/0412394 A1 Dec. 21, 2023

Related U.S. Application Data

(63) Continuation of application No. 17/784,696, filed as application No. PCT/US2021/062731 on Dec. 10, 2021, now Pat. No. 11,784,826.

(Continued)

(51) Int. Cl.
*H04L 9/40* (2022.01)
*H04L 9/00* (2022.01)
*H04L 9/32* (2006.01)

(52) U.S. Cl.
CPC .............. *H04L 9/3247* (2013.01); *H04L 9/50* (2022.05); *H04L 2209/46* (2013.01)

(58) Field of Classification Search
CPC ...... H04L 9/3247; H04L 9/50; H04L 2209/46
See application file for complete search history.

(56) References Cited

U.S. PATENT DOCUMENTS 7,181,017 B1 2/2007 Nagel et al.
9,419,951 B1 8/2016 Felsher et al.
(Continued)

FOREIGN PATENT DOCUMENTS

CN 107993059 A 5/2018
CN 108288159 A 7/2018
(Continued)

OTHER PUBLICATIONS

Ahmed et al., "Don't Mine, Wait in Line: Fair and Efficient Blockchain Consensus with Robust Round Robin", Jan. 11, 2019, 15 pages.
(Continued)

*Primary Examiner* — Ghodrat Jamshidi
(74) *Attorney, Agent, or Firm* — The Webb Law Firm

(57) ABSTRACT

Described are a system, method, and computer program product for secure real-time n-party computation. The method includes receiving a first computation input and a first portion of a one-time key from a first computer device, and receiving a second computation input and a second portion of the one-time key from a second computer device. The method also includes generating the one-time key based on the first and second portion of the one-time key, and executing a computation based on the first and second computation input. The method further includes generating an encrypted output by encrypting the computation with the one-time key, and communicating the encrypted output to the first computer device. The method further includes receiving a proof of publication from the first computer device and, in response to receiving the proof of publication,
(Continued)

communicating the one-time key to the first computer device.

20 Claims, 17 Drawing Sheets

Related U.S. Application Data

(60) Provisional application No. 63/124,159, filed on Dec. 11, 2020.

(56) References Cited

U.S. PATENT DOCUMENTS

| | | | |
|---|---|---|---|
| 10,601,828 B2 | 3/2020 | Avetisov et al. | |
| 10,846,694 B2 | 11/2020 | Wong et al. | |
| 11,159,313 B2 | 10/2021 | Fletcher | |
| 11,251,942 B2 | 2/2022 | Li et al. | |
| 11,658,815 B2* | 5/2023 | Ranellucci | H04L 9/0894 380/44 |
| 2008/0095360 A1* | 4/2008 | Vuillaume | H04L 9/3236 713/180 |
| 2018/0225448 A1 | 8/2018 | Russinovich et al. | |
| 2019/0034936 A1 | 1/2019 | Nolan et al. | |
| 2019/0095879 A1 | 3/2019 | Eyal et al. | |
| 2019/0132295 A1 | 5/2019 | Lenz et al. | |
| 2019/0156301 A1 | 5/2019 | Bentov et al. | |
| 2019/0166488 A1 | 5/2019 | Park et al. | |
| 2019/0222414 A1* | 7/2019 | Pe'er | H04L 9/088 |
| 2019/0251249 A1* | 8/2019 | Sprague | H04L 9/00 |
| 2019/0319803 A1 | 10/2019 | Misoczki et al. | |
| 2020/0014546 A1 | 1/2020 | Karame et al. | |
| 2020/0036707 A1 | 1/2020 | Callahan et al. | |
| 2020/0074464 A1 | 3/2020 | Trevethan | |
| 2020/0296128 A1 | 9/2020 | Wentz | |
| 2021/0119792 A1 | 4/2021 | Bastable et al. | |
| 2021/0288944 A1 | 9/2021 | Petri et al. | |
| 2021/0336792 A1* | 10/2021 | Agrawal | H04L 9/30 |
| 2021/0377045 A1* | 12/2021 | Doney | H04L 9/3247 |
| 2022/0006620 A1* | 1/2022 | Bursell | H04L 9/0825 |
| 2022/0021524 A1* | 1/2022 | Peddada | H04L 9/3236 |
| 2022/0045867 A1* | 2/2022 | Beery | H04L 9/0891 |

FOREIGN PATENT DOCUMENTS

| | | |
|---|---|---|
| CN | 110008686 A | 7/2019 |
| CN | 110651291 A | 1/2020 |
| CN | 110999204 A | 4/2020 |
| CN | 111181720 A | 5/2020 |
| WO | 2020157756 A1 | 8/2020 |
| WO | 2020223918 A1 | 11/2020 |

OTHER PUBLICATIONS

Androulaki et al., "Hyperledger Fabric: A Distributed Operating System for Permissioned Blockchains", Apr. 17, 2018, 15 pages.
Bellare et al., "Authenticated Encryption: Relations among Notions and Analysis of the Generic Composition Paradigm", J. Cryptol, 2008, pp. 469-491, vol. 21.
Bentov et al., "Tesseract: Real-Time Cryptocurrency Exchange Using Trusted Hardware", CCS '19, Nov. 11-15, 2019, pp. 1521-1538, London, United Kingdom.
Boyle et al., "Practical Fully Secure Three-Party Computation via Sublinear Distributed Zero-Knowledge Proofs", 2019, 37 pages.
Choudhuri et al., "Fairness in an Unfair World: Fair Multiparty Computation from public Bulletin Boards", Proceedings of the 2017 ACM SIGSAC Conference on Computer and Communications Security, 2017, 35 pages.
Fisch et al., "Iron: Functional Encryption using Intel SGX", Proceedings of the 2017 ACM SIGSAC Conference on Computer and Communications Security, 2017, 37 pages.
Gilad et al., "Algorand: Scaling Byzantine Agreements for Cryptocurrencies", SOSP' 17, Oct. 28-31, 2017, Shanghai, China, pp. 51-68.
Goldwasser et al., "A Digital Signature Scheme Secure Against Adaptive Chosen-Message Attacks", Siam J. Comput, 1988, pp. 281-308, vol. 17:2.
Hofheinz et al., "A Modular Analysis of the Fujisaki-Okamoto Transformation", SIAM Journal of Computing, Apr. 1988, pp. 281-308, vol. 17:2.
Kosba et al., "Hawk: The Blockchain Model of Cryptography and Privacy-Preserving Smart Contracts", 2016 IEEE Symposium on Security and Privacy, pp. 839-858.
Kumaresan et al., "Synchronizable Fair Exchange", Cryptology ePrint Archive, Oct. 7, 2020, pp. 1-56.
Pass et al., "Formal Abstractions for Attested Execution Secure Processors", Eurocrypt 2017, Part I, LNCS 10210, International Association for Cryptologic Research, 2017, pp. 260-289.
Ray, "Fair Multi-Party Computation on the Blockchain", https://medium.com/hackernoon/fair-multi-party-computation-on-the-blockchain-67d13af13f65, Feb. 24, 2020, 4 pages.
Sinha et al., "LucidiTEE: A TEE-Blockchain System for Policy-Compliant Multiparty Computation with Fairness", Apr. 17, 2019, 18 pages.
Soltani et al., "Practical Key Recovery Model For Self-Sovereign Identity Based Digital Wallets", 2019 IEEE Intl Conference on Dependable, Autonomic and Secure Computing, Intl Conf on Pervasive Intelligence and Computing, Intl Conf on Cloud and Big Data Computing, Intl Conf on Cyber Science and Technology Congress, 2019, pp. 320-325.
Xiao et al., "A Survey of Distributed Consensus Protocols for Blockchain Networks", IEEE Communications Surveys & Tutorials, 2020, pp. 1-34, vol. 22, No. 2.
Yahmed et al., "Trust Execution Environment and Multi-party Computation for Blockchain e-Health Systems", The Impact of Digital Technologies on Public Health in Developed and Developing Countries: 18th International Conference, ICOST, 2020, pp. 277-286.

* cited by examiner

- On input ("genKey", $i$)
    let ( epk, esk ) ← PKE.Keygen($1^\lambda$)
    ret HW.Quote(epk)
- On input ("loadMskShares", $msk_1$, $encmsk_2$)
    let $msk_2$, sig ← PKE.Dec(esk, $encmsk_2$)
    assert S.Verify(epk, sig, $msk_2$)
    let msk ← $msk_1 \oplus msk_2$
- On input ("ledgerPost", sig, nonce)
    assert S.Verify($pk_2$, sig, nonce)
    let entry ← HW.Quote(sig || PKE.Enc($pk_2$, PRF(msk, nonce)))
    ret entry
- On input ("verifyProofOfPublication", entryFromL, $\sigma$)
    assert Verify$_L$($\sigma$, entryFromL) ∧ entry = entryFromL
    ret PRF(msk, nonce)

FIG. 7

(0) Pre-processing Phase
    if $i = 1$ {
        let $e \leftarrow$ HW.Load($prog_{2pfx}$)
        let (epk,quote) $\leftarrow$ HW.Run($e$, ("genKey"))
        send (epk,quote) to $p_2$
        recv $encmsk_2$ from $p_2$
        HW.Run($e$, ("loadMskShares", $msk_1$, $encmsk_2$))
    } else if $i = 2$ {
        recv (epk, quote) from $p_1$, and assert HW.QuoteVerify(quote)
        send PKE.Enc(epk, $msk_2$) to $p_1$
    }
(1) Signature confirming receipt of encrypted output
    if encrypted output was not given, then abort
    if $i = 1$ { recv sig from $p_2$, and assert S.Verify($pk_2$, sig, nonce) }
    if $i = 2$ { send S.Sig($sk_2$, nonce) to $p_1$ }
(2) TEE-possessing party $p_1$ sends share to non-TEE party $p_2$
    if $i = 1$ { send PKE.Enc($pk_2$, $k_1$) to $p_2$ }
    if $i = 2$ { recv msg from $p_1$, and let $k_1 \leftarrow$ PKE.Dec($sk_2$, msg) }

FIG. 8

(3) Non-TEE Party $p_2$ sends share to TEE-possessing party $p_1$
    if $i = 1$ {
        recv msg from $p_2$
        let $k_2 \leftarrow$ PKE.Dec($sk_1$, msg)
    } else if $i = 2$ {
        if $p_1$ aborted in step 2 { sleep in this round, and goto step (4) }
        send PKE.Enc($pk_1$, $k_2$) to $p_1$
    }
    output $k_1 \oplus k_2$ (4) Initiating Fallback Mechanism
    if $i = 1$ {
        assert $p_2$ aborted in step 3 (else we should have terminated)
        keyenc $\leftarrow$ HW.Run($e$, ("ledgerPost", sig))
        post sig $\|$ keyenc to L
    } else if $i = 2$ {
        assert $p_1$ aborted in step 2 (else we should have terminated)
        sleep in this round, and goto step (5)
    }

(5) Completing Fallback Mechanism
    get (sig $\|$ keyenc, $\sigma$) from L
    if $i = 1$ {
        $k \leftarrow$ HW.Run($e$, ("verifyProofOfPublication", sig $\|$ keyenc, $\sigma$))
    } else if $i = 2$ {
        $k \leftarrow$ PKE.Dec($sk_2$, keyenc)
    }
    output $k$

FIG. 9

- On input ("genKey", $i$)
    let ( epk, esk ) ← PKE.Keygen($1^\lambda$)
    ret HW.Quote($i$ ∥ epk)
- On input ("loadMskShares", emsk)
    let $msk_1$ ∥ ... ∥ $msk_n$ ← PKE.Dec(esk, emsk)
    assert verify commitments
    let msk ← $msk_1$ ⊕ ... ⊕ $msk_n$
- On input ("ProofOfPublication1", signatures, $\sigma$, nonce)
    let $k$ ← PRF(msk, nonce); let $sig_1, \ldots, sig_n$ ← signatures
    assert verify$_L(\sigma) \wedge \forall j \in \{1, \ldots, n\}$. S.Verify($pk_j$, $sig_j$, nonce)
    let entry ← PKE.Enc($pk_{i+1}, k$) ∥ ... ∥ PKE.Enc($pk_n, k$)
    ret HW.Quote(entry)
- On input ("ProofOfPublication2", entryFromL, $\sigma$)
    assert Verify$_L(\sigma,$ entryFromL) ∧ entry = entryFromL
    ret PRF(msk, nonce)

FIG. 10

(0) Pre-processing Phase
    if $i \leq t$ {
        let $e \leftarrow$ HW.Load($prog_{npfx}$)
        ($epk_i$, $quote_i$) $\leftarrow$ HW.Run($e$, ("genKey"))
        send ($epk_i$, $quote_i$) to $\{p_1, \ldots, p_n\} \setminus \{p_i\}$
        recv $msg_1, \ldots, msg_t$ from $\{p_1, \ldots, p_t\} \setminus \{p_i\}$
        let ($epk_j$, $quote_j$) $\leftarrow msg_j$, and assert $\forall j$, HW.QuoteVerify($quote_j$)
        let $emsk_i \leftarrow$ PKE.Enc($epk_1$, $msk_i$), $\ldots$, PKE.Enc($epk_t$, $msk_i$)
        send $emsk_i$ to $\{p_1, \ldots, p_t\} \setminus \{p_i\}$
        recv $emsk_1, \ldots, emsk_n$ from $\{p_1, \ldots, p_n\} \setminus \{p_i\}$
        HW.Run($e$, ("loadMskShares", $emsk_1[i] \mid \ldots \mid emsk_n[i]$))
    } else {
        recv $msg_1, \ldots, msg_t$ from $\{p_1, \ldots, p_t\}$
        let ($epk_j$, $quote_j$) $\leftarrow msg_j$, and assert $\forall j$, HW.QuoteVerify($quote_j$)
        let $emsk_i \leftarrow$ PKE.Enc($epk_1$, $msk_i$), $\ldots$, PKE.Enc($epk_t$, $msk_i$)
        send $emsk_i$ to $\{p_1, \ldots, p_t\}$
    }
(1) TEE parties get signatures that all parties got encrypted output
    send S.Sig($sk_i$, nonce) to $\{p_1, \ldots, p_n\} \setminus \{p_i\}$ if got encrypted output
    if $i \leq t$ {
        recv $\{sig_j\}_{j \in \{1,\ldots,n\} \setminus \{i\}}$ from $\{p_1, \ldots, p_n\} \setminus \{p_i\}$
        assert $\forall j \in \{1, \ldots, n\}$: S.Verify($pk_j$, $sig_j$, nonce)
    }
(2) Each TEE-possessing party sends share to all non-TEE parties
    if $i \leq t$ {
        for $j \in \{t+1, \ldots, n\}$: send PKE.Enc($pk_j$, $k_i$) to $p_j$
    } else if $i > t$ {
        recv $msg_1, \ldots, msg_t$ from $p_1, \ldots, p_t$
        let $k_1, \ldots, k_t \leftarrow$ PKE.Dec($sk_i$, $msg_1$), $\ldots$, PKE.Dec($sk_i$, $msg_t$)
    }

FIG. 11

(3) Each non-TEE party sends share to all TEE-possessing parties
    if $i \leq t$ {
        recv $ek_{t+1}, \ldots, ek_n$ from $p_{t+1}, \ldots, p_n$
        let $k_{t+1}, \ldots, k_n \leftarrow$ PKE.Dec($sk_i$, $ek_{t+1}$), ..., PKE.Dec($sk_i$, $ek_n$)
    } else if $i > t$ {
        if any of $p_1, \ldots, p_t$ aborted in step (2) { goto step (4) }
        send PKE.Enc($pk_j$, $k_i$) to all $p_j \in \{p_1, \ldots, p_n\}$
        recv one of $k_{t+1}, \ldots, k_n$ from each $p_j \in \{p_{t+1}, \ldots, p_n\}$
    }
(4) If got $n$ shares, then send them to all parties; else wait for $n$ shares
    if got $n$ shares { send $k = k_1 \oplus \ldots \oplus k_n$ to $p_1, \ldots, p_n$ }
    else { if recv all $n$ shares from some $p_j \in \{p_1, \ldots, p_n\}$ }
    if got all $n$ shares, then output $k$
(5) If we still didn't get all $n$ shares, then enter fallback mechanism
    if $i \leq t$ { post $sig_1, \ldots, sig_n$ to L }
    else if $i > t$ { sleep in this round, and goto step (5) }
(6) Perform step 2 of the fallback mechanism
    if $i \leq t$ {
        get (signatures, $\sigma$) from L, where signatures = $sig_1 \| \ldots \| sig_n$
        let keyenc $\leftarrow$ HW.Run($e$, ("ProofOfPublication1", signatures, $\sigma$))
        post keyenc to L
    } else if $i > t$ { sleep in this round, and goto step (6) }
(7) Complete the fallback mechanism
    get (keyenc, $\sigma$) from L
    if $i \leq t$ {
        $k \leftarrow$ HW.Run($e$, ("ProofOfPublication2", keyenc, $\sigma$)); output $k$
    } else if $i > t$ {
        $k \leftarrow$ PKE.Dec($sk_i$, keyenc); output $k$
    }

FIG. 12

We assume $t \cdot n$ instances of $\mathcal{F}_{SyX}$, and denote them $\mathcal{F}_{SyX}^{i,j}$, where $i \in [1, \ldots, t]$ and $j \in [1, \ldots, n]$. We use $\mathcal{F}_{SyX}^{i,j}$ and $\mathcal{F}_{SyX}^{j,i}$ interchangeably to denote the same instance.

(0) Pre-processing (performed once for multiple MPC executions)
if $i \leq t$ { edges = $n$ } else { edges = $t$ }
foreach $j \in [1, \ldots,$ edges] {
   send (load, $f_1, f_2, \phi_1, \phi_2$) to $\mathcal{F}_{SyX}^{i,j}$
   get $(k_i^{i,j}, c_i^{i,j} = \text{com}(k_i^{i,j}), c_j^{i,j} = \text{com}(k_j^{i,j}))$ from $\mathcal{F}_{SyX}^{i,j}$
}

(1) Run unfair MPC protocol for function $f$ using agreed-upon id
invoke $\pi_{MPC}(x_i, \text{id}, \{k_i^{i,j}, c_i^{i,j}, c_j^{i,j}\}_{j \in [n]})$, where $x_i$ is $p_i$'s input.
$\pi_{MPC}$ emits $AE.Enc(k, f(x_1, \ldots, x_n)) \parallel \{PKE.Enc(pk_j, k_j)\}_{j \in [n]}$
$\parallel \{PKE.Enc(pk_j, k_{id}^{i,j})\}_{j \in [n]} \parallel \{AE.Enc(k_{id}^{i,j}, k_j)\}_{i \in [t], j \in [n]}$,
where $k = k_1 \oplus \ldots \oplus k_n$, and $k_{id}^{i,j} = H(k_i^{i,j} \oplus k_j^{i,j}, \text{id})$.

(2) Each TEE-possessing party sends share to all non-TEE parties
if $i \leq t$ {
   for $j \in [t+1, \ldots, n]$: send $PKE.Enc(pk_j, k_i)$ to $p_j$
} else if $i > t$ {
   recv $msg_1, \ldots, msg_t$ from $p_1, \ldots, p_t$
   let $k_1, \ldots, k_t \leftarrow PKE.Dec(sk_i, msg_1), \ldots, PKE.Dec(sk_i, msg_t)$
}

FIG. 13

(3) Each non-TEE party sends share to all TEE-possessing parties
    if $i \leq t$ {
        recv $ek_{t+1}, \ldots, ek_n$ from $p_{t+1}, \ldots, p_n$
        let $k_{t+1}, \ldots, k_n \leftarrow$ PKE.Dec($sk_i, ek_{t+1}$), ..., PKE.Dec($sk_i, ek_n$)
    } else if $i > t$ {
        if any of $p_1, \ldots, p_t$ aborted in step (2) { goto step (4) }
        send PKE.Enc($pk_j, k_i$) to all $p_j \in \{p_1, \ldots, p_n\}$
        recv one of $k_{t+1}, \ldots, k_n$ from each $p_j \in \{p_{t+1}, \ldots, p_n\}$
    }
(4) If got $n$ shares, then send them to all parties; else wait for $n$ shares
    if got $n$ shares { send $k = k_1 \oplus \ldots \oplus k_n$ to $p_1, \ldots, p_n$ }
    else { if recv all $n$ shares from some $p_j \in \{p_1, \ldots, p_n\}$ }
    if got all $n$ shares, then output $k$
(5) If we still didn't get all $n$ shares, then enter fallback mechanism
    if $i \leq t$ {
        for $j \in [i - 1]$ { send (trigger) to $\mathcal{F}_{SyX}^{i,j}$; recv $k_{id}^{i,j}$ to get $k_i, k_j$ }
        for $j \in [i + 1 \ldots n]$ { send (trigger) to $\mathcal{F}_{SyX}^{i,j}$; recv $k_{id}^{i,j}$ to get $k_j$ }
        send $k$ to all parties
    } else { receive $k$ from some party after $n$ rounds }

FIG. 14

- On input ("genKey")
    let ( epk, esk ) ← PKE.Keygen($1^\lambda$)
    ret HW.Quote(epk)
- On input ("genProtKey", in)
    let $q_1, \ldots, q_f$ ← in
    let ( $\mu_1$, $epk_1$ ) ← $q_1, \ldots,$ ( $\mu_f$, $epk_f$ ) ← $q_f$
    assert $\mu_1 = \mu(\mathcal{E}_{fct}) \wedge \ldots \wedge \mu_f = \mu(\mathcal{E}_{fct})$
    assert HW.QuoteVerify($q_1$) $\wedge \ldots \wedge$ HW.QuoteVerify($q_f$)
    let (pk, sk) ← PKE.Keygen($1^\lambda$)
    let out ← pk $\|$ PKE.Enc($epk_1$, sk), $\ldots,$ PKE.Enc($epk_f$, sk)
    ret HW.Quote(out)
- On input ("loadProtKey", in)
    let ($\mu$, pk $\|$ $ct_1, \ldots, ct_j$) ← in
    assert $\mu = \mu(\mathcal{E}_{fct}) \wedge$ HW.QuoteVerify(in)
    let sk ← PKE.Dec(esk, $ct_j$)
- On input ("revealKey1")
    assert round == 3 * t + 4
    ret HW.Quote(PKE.Enc($pk_{t+1}$, sk), $\ldots,$ PKE.Enc($pk_n$, sk))
- On input ("revealKey2")
    assert round == 4 * t + 6
    ret sk

FIG. 15

(1) Launch the $\mathcal{E}_{fct}$ enclave, and generate key material
    if $i > t$ then goto step (2)
    let $e \leftarrow$ HW.Load($prog_{fct}$)
    let $msg \leftarrow$ HW.Run($e$, ("genKey"))
    let $[q_1, \ldots, q_t] \leftarrow$ Prot$_{DS}$[msg, $\{p_1, \ldots, p_t\}$] in parallel
    let generator $\leftarrow 1$
(2) Establish Protocol Instance Key
    if generator $= i$ {
        let $msg \leftarrow$ HW.Run($e$, ("genProtKey", $q_1, \ldots, q_t$))
        invoke Prot$_{DS}$[msg, $\{p_1, \ldots, p_n\}$] as commander
    } else if generator $\leq t$ {
        let $msg \leftarrow$ Prot$_{DS}$[$\perp$, $\{p_1, \ldots, p_n\}$]
        if $msg = \perp$ then increment generator and retry step (2)
        $pk \parallel \_ \leftarrow msg$
        if $i \leq t$ { HW.Run($e$, ("loadProtKey", msg)) }
    } else {
        invoke Prot$_{HFCT}$[$p_{t+1}, \ldots, p_n$] and output result
    }
(3) Broadcast individual coins
    let $msg \leftarrow$ PKE.Enc($pk$, S.Sig($sk_{p_i}$, $b_i$))
    let $[c_{b_1}, \ldots, c_{b_n}] \leftarrow$ Prot$_{DS}$[msg, $\{p_1, \ldots, p_n\}$] in parallel

FIG. 16

(4) Sharing Secret Key
   if $i \leq t$ {
      let msg ← HW.Run($e$, ("revealKey1"))
      invoke $Prot_{DS}$[msg, $\{p_1, \ldots, p_n\}$] as commander
   } else {
      let $msg_1, \ldots, msg_t$ ← $Prot_{DS}$[⊥, $p_1, \ldots, p_n$] in parallel
      let msg be any valid message from $\{msg_1, \ldots, msg_t\}$
      if no such msg {
         invoke $Prot_{HFCT}[p_{t+1}, \ldots, p_n]$ and output result
      }
      let $[e'_{b_{t+1}}, \ldots, e'_{b_n}]$ ← msg, and let sk ← PKE.Dec($pk_{p_I}$, $e'_{b_I}$)
      let $[b_1, \ldots, b_n]$ ← [PKE.Dec(sk, $e_{b_1}$), …, PKE.Dec(sk, $e_{b_n}$)]
      output $b_1 \oplus \ldots \oplus b_n$
   }

(5) Obtain Local Output
   if $i > t$ then skip
   let sk ← HW.Run($e$, ("revealKey2"))
   let $[b_1, \ldots, b_n]$ ← [PKE.Dec(sk, $e_{b_1}$), …, PKE.Dec(sk, $e_{b_n}$)]
   output $b_1 \oplus \ldots \oplus b_n$

FIG. 17

SYSTEM, METHOD, AND COMPUTER PROGRAM PRODUCT FOR SECURE REAL-TIME N-PARTY COMPUTATION

CROSS REFERENCE TO RELATED APPLICATIONS

This application is a continuation of U.S. patent application Ser. No. 17/784,696, filed Jun. 13, 2022, entitled "System, Method, and Computer Program Product for Secure Real-Time N-Party Computation", which is the United States national phase of International Application No. PCT/US2021/062731 filed Dec. 10, 2021, and claims priority to U.S. Provisional Patent Application No. 63/124,159, filed Dec. 11, 2020, the disclosures of which are hereby incorporated by reference in their entireties.

BACKGROUND

1. Technical Field

Disclosed non-limiting embodiments or aspects relate generally to fair exchange computer protocols and, in one particular embodiment or aspect, to a system, method, and computer program product for secure real-time n-party computation.

2. Technical Considerations

Secure multiparty computation (MPC) allows a set of parties to perform a joint computation on their inputs that reveals only the final output and nothing else. These parties may be mutually distrusting and require a secure protocol to ensure a fair exchange. Secure computation, however, often cannot provide fairness in settings where many (e.g., a majority, a plurality, half, and/or the like) of the participants are corrupt. For instance, in a two-party setting, a malicious party can abort a secure computation protocol after receiving the output, leaving the other party no recourse to obtain the output. Additionally, use of a third party as an intermediary for such multiparty computations may waste resources in terms of the number of parties involved, the number of communications needed, and/or the like, and it may be possible for the third party to collude with one of the parties, thereby threatening security and fairness. There is a need to address these and other deficiencies of secure computation.

SUMMARY

Accordingly, and generally, provided is an improved system, method, and computer program product for secure real-time n-party computation.

According to non-limiting embodiments or aspects, provided is a system for multi-party computation between a first party and a second party. The system includes a first computing device associated with the first party and a trusted execution environment (TEE) associated with the first computing device. The first computing device is programmed or configured to communicate, to the TEE, a first computation input and a first portion of a one-time key. The first computing device is also programmed or configured to receive, from the TEE, an encrypted output of a computation based on the first computation input and a second computation input. The second computation input and a second portion of the one-time key are communicated to the TEE by a second computing device associated with the second party. The encrypted output is encrypted by the TEE with the one-time key. The first computing device is further programmed or configured to communicate the encrypted output to the second computing device and receive a digital signature from the second computing device indicating that the second computing device received the encrypted output. The first computing device is further programmed or configured to communicate the first portion of the one-time key to the second computing device. The first computing device is further programmed or configured to: (i) in response to receiving the second portion of the one-time key from the second computing device, determine the one-time key from the first portion of the one-time key and the second portion of the one-time key, and determine the computation by decrypting the encrypted output with the one-time key; or (ii) in response to not receiving the second portion of the one-time key from the second computing device, execute a fallback computation process using the TEE and a ledger accessible to both the first computing device and the second computing device to determine the computation.

In some non-limiting embodiments or aspects, the first computing device may be further programmed or configured to, in the fallback computation process: publish, to the ledger, the first portion of the one-time key and the digital signature received from the second computing device; receive a proof of publication from the ledger; input the proof of publication to the TEE; receive the one-time key from the TEE; and determine the computation by decrypting the encrypted output with the one-time key.

In some non-limiting embodiments or aspects, the first portion of the one-time key that is published to the ledger by the first computing device may be encrypted with a public key associated with the second computing device.

In some non-limiting embodiments or aspects, the one-time key may be generated by the TEE from the first portion of the one-time key, the second portion of the one-time key, and a unique nonce associated with an instance of the computation.

In some non-limiting embodiments or aspects, the first portion of the one-time key may be generated from a private key associated with the first computing device, and the second portion of the one-time key may be generated from a private key associated with the second computing device.

In some non-limiting embodiments or aspects, the first portion of the one-time key and the second portion of the one-time key may be communicated to the TEE in a first time period and may be configured to generate a plurality of one-time keys over successive instances of multi-party computation in subsequent time periods.

In some non-limiting embodiments or aspects, the ledger may include an append-only blockchain and may be configured to be accessible only by computing devices that contribute to the computation.

According to non-limiting embodiments or aspects, provided is a computer program product for multi-party computation between a first party and a second party. The computer program product is stored on a first computing device associated with the first party and includes at least one non-transitory computer-readable medium including program instructions. The program instructions, when executed by at least one processor of the first computing device, cause the at least one processor to communicate, to a trusted execution environment (TEE) associated with the first computing device, a first computation input and a first portion of a one-time key. The program instructions further cause the at least one processor to receive, from the TEE, an encrypted output of a computation based on the first computation input and a second computation input. The second computation input and a second portion of the one-time key are communicated to the TEE by a second computing device associated with the second party. The encrypted output is encrypted by the TEE with the one-time key. The program instructions further cause the at least one processor to communicate the encrypted output to the second computing device and receive a digital signature from the second computing device indicating that the second computing device received the encrypted output. The program instructions further cause the at least one processor to communicate the first portion of the one-time key to the second computing device. The program instructions further cause the at least one processor to: (i) in response to receiving the second portion of the one-time key from the second computing device, determine the one-time key from the first portion of the one-time key and the second portion of the one-time key, and determine the computation by decrypting the encrypted output with the one-time key; or (ii) in response to not receiving the second portion of the one-time key from the second computing device, execute a fallback computation process using the TEE and a ledger accessible to both the first computing device and the second computing device to determine the computation.

In some non-limiting embodiments or aspects, the program instructions may further cause the at least one processor to, in the fallback computation process: publish, to the ledger, the first portion of the one-time key and the digital signature received from the second computing device; receive a proof of publication from the ledger; input the proof of publication to the TEE; receive the one-time key from the TEE; and determine the computation by decrypting the encrypted output with the one-time key.

In some non-limiting embodiments or aspects, the first portion of the one-time key that is published to the ledger by the at least one processor may be encrypted with a public key associated with the second computing device.

In some non-limiting embodiments or aspects, the one-time key may be generated by the TEE from the first portion of the one-time key, the second portion of the one-time key, and a unique nonce associated with an instance of the computation.

In some non-limiting embodiments or aspects, the first portion of the one-time key may be generated from a private key associated with the first computing device, and the second portion of the one-time key may be generated from a private key associated with the second computing device.

In some non-limiting embodiments or aspects, the first portion of the one-time key and the second portion of the one-time key may be communicated to the TEE in a first time period and may be configured to generate a plurality of one-time keys over successive instances of multi-party computation in subsequent time periods.

In some non-limiting embodiments or aspects, the ledger may include an append-only blockchain and may be configured to be accessible only by computing devices that contribute to the computation.

According to non-limiting embodiments or aspects, provided is a computer-implemented method for multi-party computation between a first party and a second party. The method includes communicating, with at least one processor of a first computing device associated with the first party, to a trusted execution environment (TEE) associated with the first computing device, a first computation input and a first portion of a one-time key. The method also includes receiving, with at least one processor of the first computing device, from the TEE, an encrypted output of a computation based on the first computation input and a second computation input. The second computation input and a second portion of the one-time key are communicated to the TEE by a second computing device associated with the second party. The encrypted output is encrypted by the TEE with the one-time key. The method further includes communicating, with at least one processor of the first computing device, the encrypted output to the second computing device. The method further includes receiving, with at least one processor of the first computing device, a digital signature from the second computing device indicating that the second computing device received the encrypted output. The method further includes communicating, with at least one processor of the first computing device, the first portion of the one-time key to the second computing device. The method further includes, in response to not receiving the second portion of the one-time key from the second computing device, executing, with at least one processor of the first computing device, a fallback computation process using the TEE and a ledger accessible to both the first computing device and the second computing device to determine the computation.

In some non-limiting embodiments or aspects, the fallback computation process may include: publishing, with at least one processor of the first computing device, to the ledger, the first portion of the one-time key and the digital signature received from the second computing device; receiving, with at least one processor of the first computing device, a proof of publication from the ledger; inputting, with at least one processor of the first computing device, the proof of publication to the TEE; receiving, with at least one processor of the first computing device, the one-time key from the TEE; and determining, with at least one processor of the first computing device, the computation by decrypting the encrypted output with the one-time key.

In some non-limiting embodiments or aspects, the first portion of the one-time key that is published to the ledger may be encrypted with a public key associated with the second computing device.

In some non-limiting embodiments or aspects, the one-time key may be generated by the TEE from the first portion of the one-time key, the second portion of the one-time key, and a unique nonce associated with an instance of the computation.

In some non-limiting embodiments or aspects, the first portion of the one-time key may be generated from a private key associated with the first computing device, and the second portion of the one-time key may be generated from a private key associated with the second computing device.

In some non-limiting embodiments or aspects, the first portion of the one-time key and the second portion of the one-time key may be communicated to the TEE in a first time period and may be configured to generate a plurality of one-time keys over successive instances of multi-party computation in subsequent time periods.

According to non-limiting embodiments or aspects, provided is a computer-implemented method for multi-party computation between more than two parties. The method includes communicating, with at least one processor of a first computing device, a first input to each of a plurality of TEEs. The method further includes receiving, with at least one processor of the first computing device from a TEE of the plurality of TEEs, an encrypted output of a computation completed by the TEE of the first input and a plurality of other inputs communicated to the TEE by a plurality of other party computing devices. A number of the plurality of other party computing devices is greater than a number of the plurality of TEEs. Each of a subset of the plurality of other party computing devices is associated with a TEE of the plurality of TEEs. The method further includes broadcasting, with at least one processor of the first computing device, and in response to receiving the encrypted output, a first party signature to each of the plurality of other party computing devices that is associated with a TEE of the plurality of TEEs. The method further includes receiving, with at least one processor of the first computing device, another party signature from each of the plurality of other party computing devices in response to the plurality of other party computing devices receiving the encrypted output. The method further includes communicating, with at least one processor of the first computing device, the first input to each of the plurality of other party computing devices that is not associated with a TEE of the plurality of TEEs. The method further includes, in response to receiving the plurality of other inputs from another party computing device of the plurality of other party computing devices: generating, with at least one processor of the first computing device, the computation of the first input and the plurality of other inputs. The method further includes, in response to not receiving the plurality of other inputs from any other party computing device of the plurality of other party computing devices: executing, with at least one processor of the first computing device, a fallback computation process using a TEE of the plurality of TEEs and a shared ledger to retrieve the computation of the first input and the plurality of other inputs.

According to non-limiting embodiments or aspects, provided is a system for multi-party computation between more than two parties. The system includes a first computing device and a trusted execution environment (TEE) associated with the first computing device. At least one processor of the first computing device is programmed or configured to execute one or more steps of the above-described method for multi-party computation between more than two parties.

According to non-limiting embodiments or aspects, provided is a computer program product for multi-party computation between more than two parties. The computer program product is stored on a first computing device and includes at least one non-transitory computer-readable medium including program instructions. The program instructions, when executed by at least one processor of the first computing device, cause the at least one processor to execute one or more steps of the above-described method for multi-party computation between more than two parties.

Further non-limiting embodiments or aspects of the present disclosure will be set forth in the following numbered clauses:

Clause 1: A system for multi-party computation between a first party and a second party, the system comprising: a first computing device associated with the first party; and a trusted execution environment (TEE) associated with the first computing device, wherein the first computing device is programmed or configured to: communicate, to the TEE, a first computation input and a first portion of a one-time key; receive, from the TEE, an encrypted output of a computation based on the first computation input and a second computation input, wherein the second computation input and a second portion of the one-time key are communicated to the TEE by a second computing device associated with the second party, and wherein the encrypted output is encrypted by the TEE with the one-time key; communicate the encrypted output to the second computing device; receive a digital signature from the second computing device indicating that the second computing device received the encrypted output; communicate the first portion of the one-time key to the second computing device; and (i) in response to receiving the second portion of the one-time key from the second computing device, determine the one-time key from the first portion of the one-time key and the second portion of the one-time key, and determine the computation by decrypting the encrypted output with the one-time key; or (ii) in response to not receiving the second portion of the one-time key from the second computing device, execute a fallback computation process using the TEE and a ledger accessible to both the first computing device and the second computing device to determine the computation.

Clause 2: The system of clause 1, wherein the first computing device is further programmed or configured to, in the fallback computation process: publish, to the ledger, the first portion of the one-time key and the digital signature received from the second computing device; receive a proof of publication from the ledger; input the proof of publication to the TEE; receive the one-time key from the TEE; and determine the computation by decrypting the encrypted output with the one-time key.

Clause 3: The system of clause 1 or clause 2, wherein the first portion of the one-time key that is published to the ledger by the first computing device is encrypted with a public key associated with the second computing device.

Clause 4: The system of any of clauses 1-3, wherein the one-time key is generated by the TEE from the first portion of the one-time key, the second portion of the one-time key, and a unique nonce associated with an instance of the computation.

Clause 5: The system of any of clauses 1-4, wherein the first portion of the one-time key is generated from a private key associated with the first computing device, and wherein the second portion of the one-time key is generated from a private key associated with the second computing device.

Clause 6: The system of any of clauses 1-5, wherein the first portion of the one-time key and the second portion of the one-time key are communicated to the TEE in a first time period and are configured to generate a plurality of one-time keys over successive instances of multi-party computation in subsequent time periods.

Clause 7: The system of any of clauses 1-6, wherein the ledger comprises an append-only blockchain and is configured to be accessible only by computing devices that contribute to the computation.

Clause 8: A computer program product for multi-party computation between a first party and a second party, the computer program product being stored on a first computing device associated with the first party and comprising at least one non-transitory computer-readable medium including program instructions that, when executed by at least one processor of the first computing device, cause the at least one processor to: communicate, to a trusted execution environment (TEE) associated with the first computing device, a first computation input and a first portion of a one-time key; receive, from the TEE, an encrypted output of a computation based on the first computation input and a second computation input, wherein the second computation input and a second portion of the one-time key are communicated to the TEE by a second computing device associated with the second party, and wherein the encrypted output is encrypted by the TEE with the one-time key; communicate the encrypted output to the second computing device; receive a digital signature from the second computing device indicating that the second computing device received the encrypted output; communicate the first portion of the one-time key to the second computing device; and (i) in response to receiving the second portion of the one-time key from the second computing device, determine the one-time key from the first portion of the one-time key and the second portion of the one-time key, and determine the computation by decrypting the encrypted output with the one-time key; or (ii) in response to not receiving the second portion of the one-time key from the second computing device, execute a fallback computation process using the TEE and a ledger accessible to both the first computing device and the second computing device to determine the computation.

Clause 9: The computer program product of clause 8, wherein the program instructions further cause the at least one processor to, in the fallback computation process: publish, to the ledger, the first portion of the one-time key and the digital signature received from the second computing device; receive a proof of publication from the ledger; input the proof of publication to the TEE; receive the one-time key from the TEE; and determine the computation by decrypting the encrypted output with the one-time key.

Clause 10: The computer program product of clause 8 or clause 9, wherein the first portion of the one-time key that is published to the ledger by the at least one processor is encrypted with a public key associated with the second computing device.

Clause 11: The computer program product of any of clauses 8-10, wherein the one-time key is generated by the TEE from the first portion of the one-time key, the second portion of the one-time key, and a unique nonce associated with an instance of the computation.

Clause 12: The computer program product of any of clauses 8-11, wherein the first portion of the one-time key is generated from a private key associated with the first computing device, and wherein the second portion of the one-time key is generated from a private key associated with the second computing device.

Clause 13: The computer program product of any of clauses 8-12, wherein the first portion of the one-time key and the second portion of the one-time key are communicated to the TEE in a first time period and are configured to generate a plurality of one-time keys over successive instances of multi-party computation in subsequent time periods.

Clause 14: The computer program product of any of clauses 8-13, wherein the ledger comprises an append-only blockchain and is configured to be accessible only by computing devices that contribute to the computation.

Clause 15: A computer-implemented method for multi-party computation between a first party and a second party, the method comprising: communicating, with at least one processor of a first computing device associated with the first party, to a trusted execution environment (TEE) associated with the first computing device, a first computation input and a first portion of a one-time key; receiving, with at least one processor of the first computing device, from the TEE, an encrypted output of a computation based on the first computation input and a second computation input, wherein the second computation input and a second portion of the one-time key are communicated to the TEE by a second computing device associated with the second party, and wherein the encrypted output is encrypted by the TEE with the one-time key; communicating, with at least one processor of the first computing device, the encrypted output to the second computing device; receiving, with at least one processor of the first computing device, a digital signature from the second computing device indicating that the second computing device received the encrypted output; communicating, with at least one processor of the first computing device, the first portion of the one-time key to the second computing device; and in response to not receiving the second portion of the one-time key from the second computing device, executing, with at least one processor of the first computing device, a fallback computation process using the TEE and a ledger accessible to both the first computing device and the second computing device to determine the computation.

Clause 16: The method of clause 15, wherein the fallback computation process comprises: publishing, with at least one processor of the first computing device, to the ledger, the first portion of the one-time key and the digital signature received from the second computing device; receiving, with at least one processor of the first computing device, a proof of publication from the ledger; inputting, with at least one processor of the first computing device, the proof of publication to the TEE; receiving, with at least one processor of the first computing device, the one-time key from the TEE; and determining, with at least one processor of the first computing device, the computation by decrypting the encrypted output with the one-time key.

Clause 17: The method of clause 15 or clause 16, wherein the first portion of the one-time key that is published to the ledger is encrypted with a public key associated with the second computing device.

Clause 18: The method of any of clauses 15-17, wherein the one-time key is generated by the TEE from the first portion of the one-time key, the second portion of the one-time key, and a unique nonce associated with an instance of the computation.

Clause 19: The method of any of clauses 15-18, wherein the first portion of the one-time key is generated from a private key associated with the first computing device, and wherein the second portion of the one-time key is generated from a private key associated with the second computing device.

Clause 20: The method of any of clauses 15-19, wherein the first portion of the one-time key and the second portion of the one-time key are communicated to the TEE in a first time period and are configured to generate a plurality of one-time keys over successive instances of multi-party computation in subsequent time periods.

Clause 21: A computer-implemented method for multi-party computation between more than two parties, the method comprising: communicating, with at least one processor of a first computing device, a first input to each of a plurality of TEEs; receiving, with at least one processor of the first computing device from a TEE of the plurality of TEEs, an encrypted output of a computation completed by the TEE of the first input and a plurality of other inputs communicated to the TEE by a plurality of other party computing devices, wherein a number of the plurality of other party computing devices is greater than a number of the plurality of TEEs, and wherein each of a subset of the plurality of other party computing devices is associated with a TEE of the plurality of TEEs; broadcasting, with at least one processor of the first computing device and in response to receiving the encrypted output, a first party signature to each of the plurality of other party computing devices that is associated with a TEE of the plurality of TEEs; receiving, with at least one processor of the first computing device, another party signature from each of the plurality of other party computing devices in response to the plurality of other party computing devices receiving the encrypted output; communicating, with at least one processor of the first computing device, the first input to each of the plurality of other party computing devices that is not associated with a TEE of the plurality of TEEs; and, in response to receiving the plurality of other inputs from another party computing device of the plurality of other party computing devices: generating, with at least one processor of the first computing device, the computation of the first input and the plurality of other inputs; or, in response to not receiving the plurality of other inputs from any other party computing device of the plurality of other party computing devices: executing, with at least one processor of the first computing device, a fallback computation process using a TEE of the plurality of TEEs and a shared ledger to retrieve the computation of the first input and plurality of other inputs.

Clause 22: A system for multi-party computation between more than two parties, the system comprising a first computing device and a trusted execution environment (TEE) associated with the first computing device, wherein at least one processor of the first computing device is programmed or configured to execute one or more steps of clause 21.

Clause 23: A computer program product for multi-party computation between more than two parties, the computer program product being stored on a first computing device and comprising at least one non-transitory computer-readable medium including program instructions, wherein the program instructions, when executed by at least one processor of the first computing device, cause the at least one processor to execute one or more steps of clause 21.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying figures, in which:

FIG. 7 is a set of pseudocode describing a method for secure real-time n-party computation, according to non-limiting embodiments or aspects;

FIG. 8 is a set of pseudocode describing a method for secure real-time n-party computation, according to non-limiting embodiments or aspects;

FIG. 9 is a set of pseudocode describing a method for secure real-time n-party computation, according to non-limiting embodiments or aspects;

FIG. 10 is a set of pseudocode describing a method for secure real-time n-party computation, according to non-limiting embodiments or aspects;

FIG. 11 is a set of pseudocode describing a method for secure real-time n-party computation, according to non-limiting embodiments or aspects;

FIG. 12 is a set of pseudocode describing a method for secure real-time n-party computation, according to non-limiting embodiments or aspects;

FIG. 13 is a set of pseudocode describing a method for secure real-time n-party computation, according to non-limiting embodiments or aspects;

FIG. 14 is a set of pseudocode describing a method for secure real-time n-party computation, according to non-limiting embodiments or aspects;

FIG. 15 is a set of pseudocode describing a method for secure real-time n-party computation, according to non-limiting embodiments or aspects;

FIG. 16 is a set of pseudocode describing a method for secure real-time n-party computation, according to non-limiting embodiments or aspects; and FIG. 17 is a set of pseudocode describing a method for secure real-time n-party computation, according to non-limiting embodiments or aspects.

Figure 1:
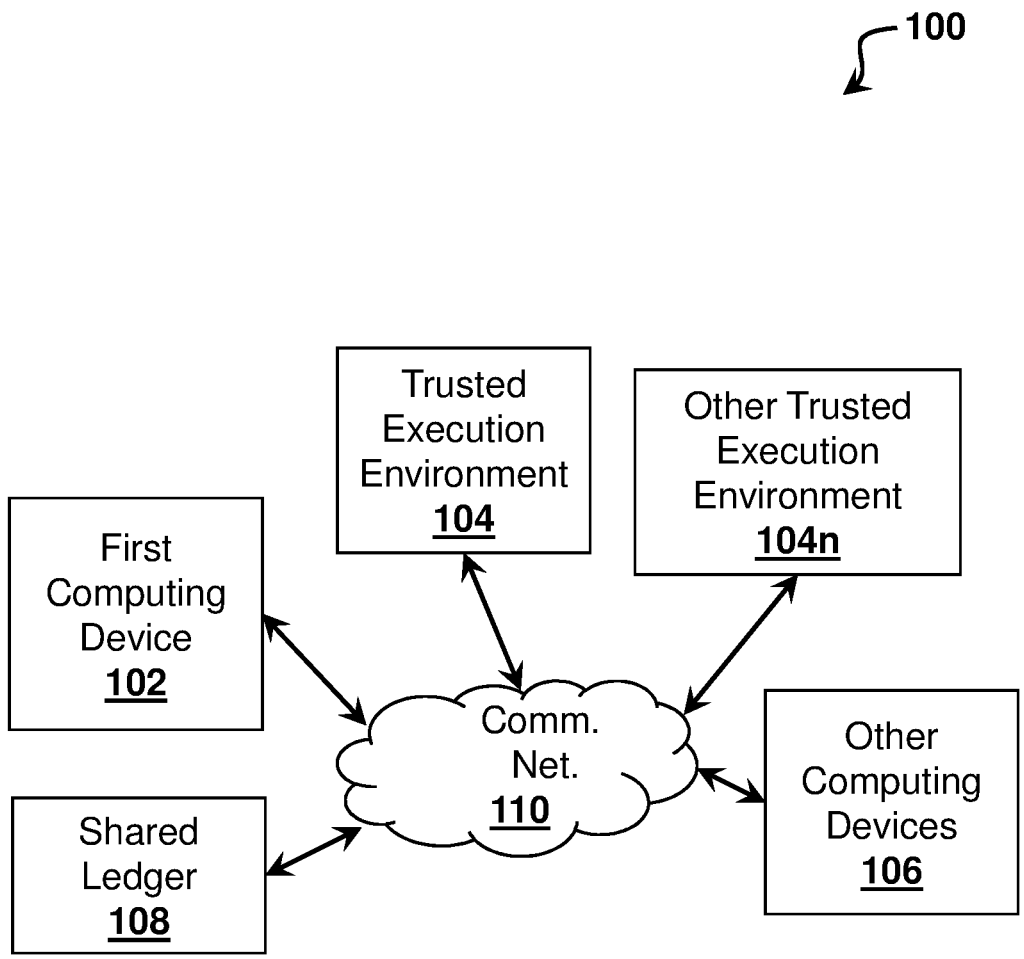
FIG. 1 is a diagram of a non-limiting embodiment or aspect of an environment in which systems, apparatuses, and/or methods, as described herein, may be implemented.

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

For purposes of the description hereinafter, the terms "upper", "lower", "right", "left", "vertical", "horizontal", "top", "bottom", "lateral", "longitudinal," and derivatives thereof shall relate to non-limiting embodiments or aspects as they are oriented in the drawing figures. However, it is to be understood that non-limiting embodiments or aspects may assume various alternative variations and step sequences, except where expressly specified to the contrary. It is also to be understood that the specific devices and processes illustrated in the attached drawings, and described in the following specification, are simply exemplary embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, the term "acquirer institution" may refer to an entity licensed and/or approved by a transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments or aspects, an acquirer institution may be a financial institution, such as a bank. As used herein, the term "acquirer system" may refer to one or more computing devices operated by or on behalf of an acquirer institution, such as a server computer executing one or more software applications.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of tokens for different individuals or purposes.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer. An "application" or "application program interface" (API) may refer to computer code or other data sorted on a computer-readable medium that may be executed by a processor to facilitate the interaction between software components, such as a client-side front-end and/or server-side back-end for receiving data from the client. An "interface" may refer to a generated display, such as one or more graphical user interfaces (GUIs) with which a user may interact, either directly or indirectly (e.g., through a keyboard, mouse, etc.).

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer devices operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, computers, servers, input devices, and/or other like devices that can be used to initiate a payment transaction.

As used herein, the term "payment device" may refer to an electronic payment device, a portable financial device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a PDA, a pager, a security card, a computing device, an access card, a wireless terminal, a transponder, and/or the like. In some non-limiting embodiments or aspects, the payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, POS devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, an electronic payment processing network may refer to the communications between one or more entities for processing the transfer of monetary funds to one or more transactions. The electronic payment processing network may include a merchant system, an acquirer system, a transaction service provider, and an issuer system.

Non-limiting embodiments or aspects of the present disclosure are directed to a system, method, and computer program product for secure real-time n-party computation. As used herein, "computation" may refer to any joint effort between computing devices where independent inputs are combined to produce a result based on each input. For example, computation may include, but is not limited to, mathematical computation, data compilation and exchange, execution of contracts, transactional exchange, and/or the like. It will be appreciated that described systems and methods for two-party exchange may be expanded to n-party computations, where n>1. Described and non-limiting embodiments and aspects improve upon existing technical solutions by providing an architecture for secure, fairness-assured joint computation. The described systems and methods provide fair secure computation with fallback mechanisms if a participating party should cease cooperation. No third party intermediary computing devices need to be involved to assure fairness, reducing communication time associated with outside transmissions, and decreasing the number of party resources involved. Furthermore, the described systems and methods remove the possibility of a third party intermediary computing device colluding with one of the parties, thereby threatening security and fairness. In the present described methods, a corrupt party cannot receive the final output without the assurance that other participating parties also have access to joint computation. Moreover, the computation and exchange of information can happen in real-time to other processes (e.g., transaction processing) by not relying on third party verification services.

In addition to the above-described technical improvements, described systems and methods provide a more computationally efficient process for multi-party computation by not relying on a shared ledger (e.g., a blockchain), except and until any party proves to be malicious and aborts early. This configuration reduces the number of computational resources and independent communications required to execute fair multi-party computation.

Protocol Terminology

As used herein, a "broadcast" protocol for n parties $\{P_1, \ldots P_n\}$, where a commander $P_c \in \{P_1, \ldots, P_n\}$ inputs a message m, terminates with properties of agreement and validity. Agreement states that all honest parties output the same value, and validity states that all parties output m if the commander is honest. The term "broadcast" may refer to the Dolev-Strong broadcast protocol.

As used herein, a "trusted execution environment" (TEE) may refer to a secure area of a main processor. A TEE may guarantee that code and data loaded inside is protected with respect to confidentiality and integrity. An enclave program is an isolated region of memory, containing both code and data, protected by the TEE platform (where trust is only placed in the processor manufacturer). On TEE platforms (e.g., Intel® SGX, Sanctum™, etc.), the central processing unit (CPU) monitors all memory accesses to ensure that non-enclave software (e.g., operating system, Hypervisor®, basic input/output system (BIOS) software, system management mode (SMM) firmware, etc.) cannot access the enclave's memory. In addition to isolated execution, as used herein, the TEE platform may provide a primitive for remote attestation. At any time, the enclave software may request a signed message, called a "quote", binding an enclave-supplied value to that enclave's code identity (e.g., as a hash-based measurement).

As used herein, described protocols may make use of a shared, append-only ledger. This ledger may be referred to in the context of a "bulletin board" abstraction. The shared ledger allows parties to get the contents of the ledger and post arbitrary strings on it. Furthermore, on successfully publishing a string on the shared ledger, any party can request a proof (e.g., a publicly verifiable proof) that the string was indeed published, and the shared ledger guarantees that the string will never be modified or deleted. Hence, the shared ledger may also be referred to as an append-only ledger. In some non-limiting embodiments or aspects, the shared ledger may be instantiated using fork-less blockchains, e.g., permissioned blockchains, or by blockchains based on proof-of-stake.

In some non-limiting embodiments or aspects, described protocols may make use of an environment where the parties have a fully connected network with point-to-point communication channels and can communicate in synchronous rounds (e.g., stages of steps executed sequentially over time). Moreover, described protocols may include a public key infrastructure amongst the parties, where each part has a public key $pk_i$ and a private key $sk_i$. The honest parties use a key generation algorithm to generate the key-pair. Malicious parties may generate arbitrary keys. Prior to running the coin-tossing protocol (described further below), all parties have the same vector of public keys of all other participants. The coin-tossing protocol may include a public key encryption scheme and digital signature scheme, which enables the parties to communicate via authenticated channels, thereby preventing an adversary from modifying messages or injecting messages that claim to be from a different (honest) party.

Two-Party Protocol

In some non-limiting embodiments or aspects, described is a protocol tailored to the two-party setting, which may be simpler and more round-efficient (e.g., fewer stages of steps) compared to the generalized n-party protocol. The goal of the two-party protocol is as follows. The parties wish to perform a joint secure computation of some function f over private inputs from both parties, with fairness: either both parties get the output of f, or no one does. The described two-party protocol improves over prior techniques, in that the protocol avoids posting to the shared ledger in the case where the parties behave honestly and follow the protocol's steps (thereby reducing the recruitment of additional computer resources to the multi-party computation). Second, the described two-party protocol enables pre-processing, where subsequent evaluations of f (over different inputs from the two parties) can amortize the work from the earlier phases of the protocol—this helps to reduce the round complexity (e.g., fewer steps per stage) of the protocol.

The described two-party protocol reduces the problem of fair secure computation to fair reconstruction of an additive secret sharing scheme, by encrypting the output of f under a randomly chosen key k, and distributing xor shares of k to both parties—xor ensures that each share reveals zero information about k. In that sense, the reconstruction protocol's responsibility is to ensure fair exchange of the shares held by each party. It will be appreciated that two-party fair exchange implies two-party fair computation, and vice versa. In this approach, both parties are on a shared ledger, and one of the parties has access to a TEE.

The protocol includes a fallback mechanism (to be invoked by the TEE-possessing party) containing a TEE-ledger interaction that gives the decryption key k to all parties—during malicious behavior, the non-TEE party may wait for the other party to perform this TEE-ledger interaction, or else, the non-TEE party is guaranteed that no party gets k, thus ensuring fairness to both parties. The described protocol has the parties share their keys with each other in a particular sequence, where regardless of when the other party deviates from the protocol (e.g., aborts), the other party has a mechanism to terminate the protocol with fairness.

The protocol commences with a pre-processing step which loads both parties' computational shares (e.g., inputs) in the TEE, which is useful during the TEE-ledger interaction in the event of malicious behavior. This step may only need to be performed once for multiple invocations of the two-party protocol (e.g., for multiple evaluations of the function f). The pre-processing phase "loads" the TEE with a secret key from which k is derived for each instance of the two-party protocol. To that end, instead of choosing k randomly, k may be derived from long-term secret keys held by both parties and a unique nonce for that instance of the two-party protocol. Then, the (unfair) MPC may receive the keys, e.g., $msk_1$ and $msk_2$, as input from both parties, along with the common value of nonce, and may produce the output encrypted under:

$$k \doteq \text{PRF}(msk_1 \oplus msk_2, \text{nonce}) \qquad \text{Formula 1}$$

The two-party protocol terminates in both parties getting the decryption key, which is no use if the parties are not given the encrypted outputs. Therefore, as a first step in the fair exchange protocol, the second party $P_2$ sends a signature signifying $P_2$'s receipt of the encrypted output. Should $P_2$ not send this message, the protocol may abort and no party may learn the output. Although $P_2$ can abort if $P_2$ does not attain the encrypted output from the two-party protocol, a malicious first party $P_1$ may still carry out the fallback mechanism, which uses a TEE-ledger interaction to provide the decryption key to both parties with fairness, and which would not be useful to $P_2$ without the encrypted output. The signature protects $P_2$ against $P_1$ maliciously initiating the fallback TEE-ledger interaction. It will be appreciated that it suffices for only $P_1$ to receive $P_2$'s signature, since only $P_1$ may use $P_1$'s TEE to trigger the TEE-ledger interaction.

The two-party protocol further imposes an order in which the parties reveal their shares to each other. Since only $P_1$ has a TEE and can invoke the fallback mechanism as a recourse against malicious behavior, $P_1$ is required to first send $P_1$'s share to $P_2$. It will be appreciated that alternative approaches, such as $P_2$ sharing first or simultaneous sharing of the shares, opens the possibility of $P_1$ attaining all shares, leaving $P_2$ without any recourse.

If $P_2$ receives a share from $P_1$, $P_2$ sends $P_2$'s share to $P_1$. While it is possible that $P_1$ could abort the protocol (in which case, no party gets both shares), there is also a possibility that $P_1$ may maliciously avoid sending the messages to $P_2$ and may instead trigger the fallback TEE-ledger mechanism. For that reason, if $P_2$ does not receive any message, $P_2$ reads the shared ledger thereafter, searching for messages from a potential trigger of the fallback mechanism. If either party deviates from the fair exchange protocol, the fallback mechanism may be employed. $P_1$ is required to post a message to the shared ledger containing the aforementioned signature from $P_2$, and the decryption key (encrypted under $P_2$'s public key). Both parties may retrieve the ledger entry to complete the protocol. For $P_2$, the ledger entry contains the decryption key, which $P_2$ outputs. Meanwhile, $P_1$ provides the proof of publication (denoting that the entry was successfully posted on the shared ledger) to the local TEE, which proceeds to verify the proof and release the decryption key locally to $P_1$.

For the purpose of further illustration, two-party fair reconstruction, including a first party ($P_1$) and a second party ($P_2$), may be further described as a process occurring in a series of rounds. Rounds, as used herein, may refer to sequential stages in which one or more steps of the described method occur. For two-party fair reconstruction, $P_1$ may launch a TEE, which attests itself to $P_2$ and establishes a session key sk with $P_2$. $P_2$ may use this session key sk to encrypt its inputs. The TEE may also generate a master session key msk, which is always kept within the TEE and is used to derive the one-time key k=PRF(msk,id), where id is the function evaluation's unique identifier. For illustrative purposes, $P_1$ may be associated with a TEE, and $P_2$ may not be associated with a TEE. It may be assumed that both $P_1$ and $P_2$ have access to a shared ledger (L). The function "Enc" may denote an encryption function, the function "PRF" may denote a pseudorandom function, and the function "Sign" may denote a digital signature function.

In Round 0, $P_1$ waits for input Enc(sk,$x_2$)//id from $P_2$. Also in Round 0, $P_2$ sends input Enc(sk,$x_2$)//id to $P_1$. In Round 1, $P_1$ sends encrypted output m1=Enc(k,y) to $P_2$, where k=PRF(msk,id). Also in Round 1, P2 waits for encrypted output m1=Enc(k,y) from $P_1$. If $P_2$ does not receive m1, then $P_2$ may abort the reconstruction process. In Round 2, $P_1$ waits for signature m2=sign(s$k_2$,id) from $P_2$. If no message is received, then $P_1$ may abort the reconstruction process. Also in Round 2, $P_2$ sends signature m2=sign(s$k_2$, id) to $P_1$ signifying that $P_2$ got the encrypted output from Round 1. In Round 3, $P_1$ sends m3=Enc(p$k_2$,k) to $P_2$. Also in Round 3, $P_2$ waits for m3=Enc(p$k_2$,k) from $P_1$. In Round 4, $P_1$ waits for m4=Enc(p$k_1$,k) from $P_2$. Also in Round 4, if $P_2$ received m3 from $P_1$, then $P_2$ may send m4=Enc(p$k_1$,k) to $P_1$ and return k. If $P_2$ did not receive m3, $P_2$ may sleep (e.g., do nothing). In Round 5, if $P_1$ does not receive m4, then $P_1$ may trigger a fallback process by posting Enc(p$k_2$,k) to L. Also in Round 5, $P_2$ may sleep. In Round 6, $P_1$ receives proof of publication from L and provides the proof of publication to TEE to get k. Also in Round 6, party $P_2$ receives proof of publication and entry from L to get k.

N-Party Fair Computation

The present disclosure further provides a generalized protocol for n-party fair computation. The goal of the protocol is to perform a joint secure computation of some function f over private inputs from all n parties, with fairness. A fair exchange indicates that either all the parties receive the output of function f, or no party does.

The described n-party protocol is designed for an optimistic execution off-chain, where the protocol avoids posting to the shared ledger when the parties behave honestly and follow the protocol's steps. This reduces computational resources when compared to other methods that require posts to the shared ledger throughout the process. Second, the protocol enables pre-processing, where subsequent evaluations of f (over different inputs from the n parties) can amortize the work from the earlier phases of the protocol. This helps to improve the round complexity of the protocol.

In the n-party protocol, the problem of fair secure computation is reduced to fair reconstruction of an additive secret sharing scheme, by encrypting the output of f under a random key k, and distributing xor shares $k_1, \ldots, k_n$ of k to all n parties, such that:

$$k = k_1 \oplus \ldots \oplus k_n \quad \text{Formula 2}$$

Distributing xor shares ensures that each share reveals zero information about k. In that sense, the reconstruction protocol's responsibility is to ensure fair exchange of the shares held by each party. The n-party protocol may give each party the encrypted output and that party's share of k. Moreover, all parties are on a shared ledger, and t out of n parties have access to a TEE (for a corruption threshold t in a static corruption model).

The n-party protocol relies on a fallback mechanism, to be invoked by any TEE-possessing party that detects malicious behavior, containing a TEE-ledger interaction that gives the decryption key k to all parties. During malicious behavior, the non-TEE parties may wait for some honest TEE-possessing party to perform this TEE-ledger interaction, or else, they are guaranteed that no party gets k, thus ensuring fairness to all n parties. The technical challenge addressed by this protocol's design is to have the parties share their keys with each other in a safe sequence, where regardless of when a malicious party deviates from the protocol (e.g., aborts after receiving sufficient shares), the other parties have a mechanism to carry out the remaining protocol steps with the guarantee of fairness.

The n-party protocol may be executed between n parties $P_1, \ldots, P_n$. At a high-level, if all parties behave honestly (optimistic setting), the protocol terminates in a fixed number of rounds with no interaction with the shared ledger. Moreover, if any party behaves maliciously, the protocol either terminates (when there is a guarantee that no party could have recovered the key k), or uses a TEE-ledger interaction to deliver k to all parties with fairness.

Similar to the two-party protocol, the n-party protocol may be commenced with a pre-processing step where parties submit their secrets to all t TEEs, which is useful during the fallback TEE-ledger mechanism in the event of malicious behavior. Similar to the two-party protocol, the output of f is encrypted under a key k that is not chosen randomly, but is instead generated from long-term secret keys held by all parties. Specifically, the (unfair) multi-party computation protocol encrypts the output of f under key:

$$k \doteq \text{PRF}(msk_1 \oplus \ldots \oplus msk_n, \text{nonce}) \quad \text{Formula 3}$$

where each party $P_i$ maintains a long term secret key $msk_i$ and inputs said long-term secret key to each instance of the protocol. Hence, the pre-processing step is amortized across several instances of the unfair multi-party computation protocol and the fair reconstruction protocols.

The n-party protocol guarantees that all n parties (or no parties) attain the decryption key, but that is of no use if any subset of the parties do not get the encrypted output from the (unfair) multi-party computation protocol execution. Therefore, as a first step in the fair reconstruction protocol, each party sends a signature signifying their receipt of the encrypted output. The signature is sent only to the t parties with TEEs, and having all n signatures is a prerequisite for the fallback TEE-ledger mechanism that gives k to all parties. It will be appreciated that a malicious party can later carry out the fallback mechanism that uses a TEE-ledger interaction to provide the decryption key to all parties with fairness, but that mechanism is of no use to a party that does not receive the encrypted output. Therefore, the signature protects non-malicious parties from malicious parties initiating the fallback TEE-ledger interaction.

The n-party protocol imposes an order in which the parties reveal the shares to each other. Since only parties with TEEs can invoke the fallback mechanism (described below) as a recourse against malicious behavior, the n-party protocol imposes an order where each party $P_i \in \{P_1, \ldots, P_t\}$ first sends its share of k to each $P_j \in \{P_1, \ldots, P_n\}$. Note that alternative approaches, such as $P_j$ sharing first or simultaneous sharing of the shares, open the possibility of some malicious party $P_i$ attaining all shares, leaving an honest party $P_j$ without any recourse.

On receiving all t shares, each non-TEE party $P_j$ may send its share of k to each TEE-possessing party $P_i$. If a $P_j$ did not receive all t shares, then it may transition to the fallback mechanism (described below). While it is possible that $P_j$ did not receive a share because a TEE party $P_i$ aborted the protocol, it may be possible that $P_i$ acted maliciously and withheld its share $k_i$ from $P_j$ and instead proceed to trigger the fallback TEE-ledger interaction. Therefore, party $P_j$ cannot simply abort, but must read the shared ledger in the subsequent time period for a TEE-ledger interaction, which is designed to release k to all parties.

Any party to get all n shares may broadcast k to all parties. For example, if any honest party (TEE or non-TEE) receives all n shares of k, then said party broadcasts k to all parties. If the party did not get all n shares, then said party may attempt to receive k from an honest party. If the party still does not get k, then it may enter the fallback mechanism.

The fallback mechanism constitutes a TEE-ledger interaction. Any TEE-possessing party $P_i$ can post a message to the shared ledger including all n signatures. The signatures not only indicate that all parties have the encrypted output, but posting them on the ledger enables any of the other TEE parties to carry out the next steps of the fallback mechanism. It will be appreciated that it is possible that a malicious party did not send its signature to a TEE party at the beginning of the n-party protocol. In the next steps of the fallback mechanism, reading the ledger entry provides a proof of publication that indicates that the entry was successfully posted on the shared ledger and is accessible to all parties. On providing this proof to the TEE, any TEE-possessing party can advance the protocol by posting a second message on the shared ledger. This message contains an encryption key k under the public keys of all non-TEE parties. Finally, all parties may retrieve the ledger entry to complete the fallback mechanism. For non-TEE parties, the ledger entry contains the decryption key. On the other hand, each TEE-possessing party provides the proof of publication (denoting that the entry was successfully posted on the shared ledger) to the local TEE, which proceeds to verify the proof and release the decryption key locally to that party.

N-Party Fair Coin Tossing

Further described is a fair n-party coin tossing protocol, for arbitrary n. The described coin tossing protocol lets each party $P_i$ input a chosen (random) bit $b_i$, and the honest parties output the xor of bits from all honest parties. The coin tossing protocol is based on the premise that parties perform the protocol steps obliviously, e.g., without any knowledge of the bits from the other parties, until the final step of the protocol returns the output. In other words, the attacker does not learn the inputs of honest parties from their messages until the last step where the uniformly random output is produced. This is achieved by having parties broadcast an encryption of their chosen bits under a key known only to the t enclaves, e.g., even the parties who control the TEEs do not learn the bits. Next, any party with a TEE broadcasts the enclave private key to all parties, allowing each party to decrypt the chosen bits of all other parties and compute the output.

The t parties with TEE nodes launch an enclave program on their local machine. As a first step, the coin-tossing protocol generates ephemeral public key encryption (PKE) keys within enclaves, and communicates the public key material to all parties for establishing a secure channel with the enclave. To that end, each enclave executes:

$$(epk_i, esk_i) \leftarrow \text{PKE·Keygen}(\lambda) \qquad \text{Formula 4}$$

and returns enclave public key $epk_i$ to the local party $P_i$ while keeping enclave private key $esk_i$ in enclave private memory. Then, all of the t parties engage in a broadcast protocol (in parallel) to send their $epk_i$ to all parties $P_1, \ldots, P_t$. Specifically, each $P_i \in \{P_1, \ldots, P_t\}$ invokes the broadcast protocol with the following message:

$$p_i : \text{quote}_{HW}(\varepsilon_{fcr}, epk_i), \text{ where}(epk_i, esk_i) \leftarrow \text{PKE·Keygen}(1^\lambda) \qquad \text{Formula 5}$$

Each instance of the broadcast protocol requires t+1 rounds (where t is the corruption threshold and also the number of parties with a TEE), and all t parties execute an instance of the protocol in parallel, where each party acts as the commander in their own instance of the protocol.

Since the later steps of the coin tossing protocol use broadcast of encrypted messages, the protocol establishes a shared key for use by all parties, whose private component will be kept within the enclaves (to prevent the parties from prematurely learning other parties' inputs). By establishing a shared key for all future encryptions by all parties, the protocol may progress even when some parties with TEEs abort. The protocol may also optimize the message lengths as they contain the encryption under only one key. To that end, the protocol establishes a PKE key that is shared with all enclaves and is used by all parties to encrypt their bits. The enclaves are tasked with holding onto this key until all parties have broadcasted their chosen bits, preventing any party from learning an honest party's chosen bit. One party is selected as a leader (e.g., $P_1$) to generate a PKE key from within its enclave and broadcast the public key material to all parties and the secret key material to the enclaves (by encrypting under their keys from the previous step). Should the leader act maliciously (e.g., the honest parties output ⊥ at the end of the broadcast protocol), the protocol retries with the next leader, where leaders iterate from $P_1$ to $P_t$. If all t parties with TEEs act maliciously during this step, then the remaining n−t honest parties execute an honest variant of the fair coin tossing protocol (where the honest parties simply broadcast their chosen bits to other honest parties in the clear).

All n parties must broadcast their chosen bits to every other party, but they cannot simply expose these values in the clear lest the adversary bias the final output. Given that a shared public key pk has been established, each party $P_i$ signs and encrypts its bit $b_i$ under the key pk. The signature prevents copycat attacks, where an attacker copies an honest party's bit and biases the output. Each party $P_i$ further broadcasts the signed ciphertext to the other parties:

$$p_i : \text{PKE·Enc}(pk, S·\text{Sig}(sk_{pi}, b_i)) \qquad \text{Formula 6}$$

Ciphertexts can only be decrypted within the TEEs, as all copies of the private key sk are stored within enclave memory. Security is achieved (e.g., adversarial bias is prevented) by having the parties carry out the protocol while remaining oblivious of each other's chosen bits. Hence, a corrupt party may choose to deviate from the protocol but must make this decision without knowledge of the honest parties' inputs. This allows the final output of the honest parties' to be unbiased.

The broadcast protocol ensures that all honest parties have the encrypted bits of all other honest parties. To compute the final output bit, which is the xor of all parties' bits, the private key sk must be exposed out of the enclave and shared with all the parties. To that end, each party with an enclave extracts encryptions of sk under each of the non-enclave public keys from its local enclave and broadcasts this to all parties, as indicated below.

$$\text{quote}_{HW}(\varepsilon_{fe_i}, \{\text{PKE-Enc}(pk_i, sk)\}_{i>t}) \qquad \text{Formula 7}$$

At the end of this phase, honest parties without a TEE agree on whether any of them obtained the vector of encryptions of sk. If none of them received the encryptions, then this means that all t parties with TEEs acted maliciously during this step. In this case, the remaining n–t honest parties may execute an honest variant of the fair coin tossing protocol (e.g., one honest party picks a random bit and sends it to all other parties). This works because, at this point in the protocol, the t malicious parties (e.g., all those possessing TEEs) are unaware of the final output, and thus their decision to abort is independent of the value of the coin. On the other hand, even when one party with a TEE acts honestly, then all honest parties without a TEE obtain sk from the broadcast and are able to decrypt the encryptions and obtain the output. In a scenario with at least one honest party with a TEE, said parties may then instruct their enclave to release sk following which they are able to decrypt the encryptions and obtain their output.

Illustrated Non-Limiting Embodiments and Aspects

Referring now to FIG. 1, illustrated is a diagram of an example environment 100 in which devices, systems, and/or methods, described herein, may be implemented. As shown in FIG. 1, environment 100 includes a first computing device 102 associated with a first party, a trusted execution environment (TEE) 104, one or more other computing devices 106 associated with parties other than the first party, a shared ledger 108, and a communication network 110. The TEE 104 may be associated with and/or implemented on the same device as the first computing device 102. One or more other ledgers 108 may be used, which may be accessible by one or more other computing devices 106. The shared ledger 108 may include an append-only blockchain, e.g., permissioned blockchains, and may be configured to be accessible only by computing devices that contribute to the computation (e.g., a first computing device 102 and at least one other computing device 106).

One or more other TEEs 104 may be associated with and/or implemented on other computing devices 106, according to the steps disclosed herein. Communication network 110 may include one or more wired and/or wireless networks. For example, communication network 110 may include a cellular network (e.g., a long-term evolution (LTE®) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network, an ad hoc network, a mesh network, a beacon network, an intranet, the Internet, a fiber optic-based network, a cloud computing network, and/or the like, and/or a combination of these or other types of networks.

In some non-limiting embodiments or aspects of multi-party computation between two parties, first computing device 102 may communicate a first computation input (e.g., the first party's contribution to the computation) and a first portion (e.g., share) of a one-time key to the TEE 104. TEE 104 may receive a second computation input (e.g., a second party's contribution to the computation) and a second portion (e.g., share) of the one-time key from at least one other computing device 106. TEE 104 may generate the one-time key from the first portion of the one-time key and the second portion of the one-time key. The TEE 104 may further generate the one-time key from a unique nonce associated with an instance of the computation (e.g., for each iteration of the computation when multiple successive computations are carried out between parties). The first portion of the one-time key may be generated from a private key (e.g., of a private-public key pair) associated with the first computing device 102. The second portion of the one-time key may be generated from a private key (e.g., of a private-public key pair) associated with the at least one other computing device 106. The first portion and the second portion of the one-time key may be communicated to the TEE 104 in a first time period and used by the TEE 104 to generate a plurality of one-time keys over successive instances of multi-party computation in subsequent time periods. TEE 104 may generate the computation based on the first computation input and the second computation input. TEE 104 may further encrypt the computation result using the one-time key to produce an encrypted output. First computing device 102 may receive the encrypted output from the TEE 104.

First computing device 102 may further communicate the encrypted output to at least one other computing device 106. In response to receiving the encrypted output, the at least one other computing device 106 may generate a digital signature indicating that the at least one other computing device 106 received the encrypted output. First computing device 102 may receive the digital signature from the at least one other computing device 106. In response to receiving the digital signature, first computing device 102 may communicate the first portion of the one-time key to the at least one other computing device 106. The first computing device 102 may then wait to receive the second portion of the one-time key from the at least one other computing device 106.

In response to receiving the second portion from the at least one other computing device 106, the first computing device 102 may determine the one-time key from the first portion of the one-time key and the second portion of the one-time key. The first computing device 102 may further determine the computation by decrypting the encrypted output with the one-time key.

In response to not receiving the second portion of the one-time key from the at least one other computing device 106, the first computing device 102 may execute a fallback computation process using the TEE 104 and a ledger accessible to both the first computing device 102 and the at least one other computing device 106 to determine the computation.

In some non-limiting embodiments or aspects, the first computing device 102 may execute the fallback process in a series of steps. First computing device 102 may publish, to the shared ledger 108, the first portion of the one-time key and the digital signature received from the second computing device. The one-time key that is published to the shared ledger 108 may be encrypted with a public key associated with the at least one other computing device 106. First computing device 102 may receive a proof of publication from the ledger 108 and input the proof of publication to the TEE 104. TEE 104 may validate the proof of publication and, in response, send the one-time key, or the second portion of the one-time key, to the first computing device 102. First computing device 102 may receive the one-time key from the TEE 104, or the second portion of the one-time key with which the one-time key may be derived, and determine the computation by decrypting the encrypted output with the one-time key.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally or alternatively, a set of devices (e.g., one or more devices) of environment 100 may perform one or more functions described as being performed by another set of devices of environment 100.

Figure 2:
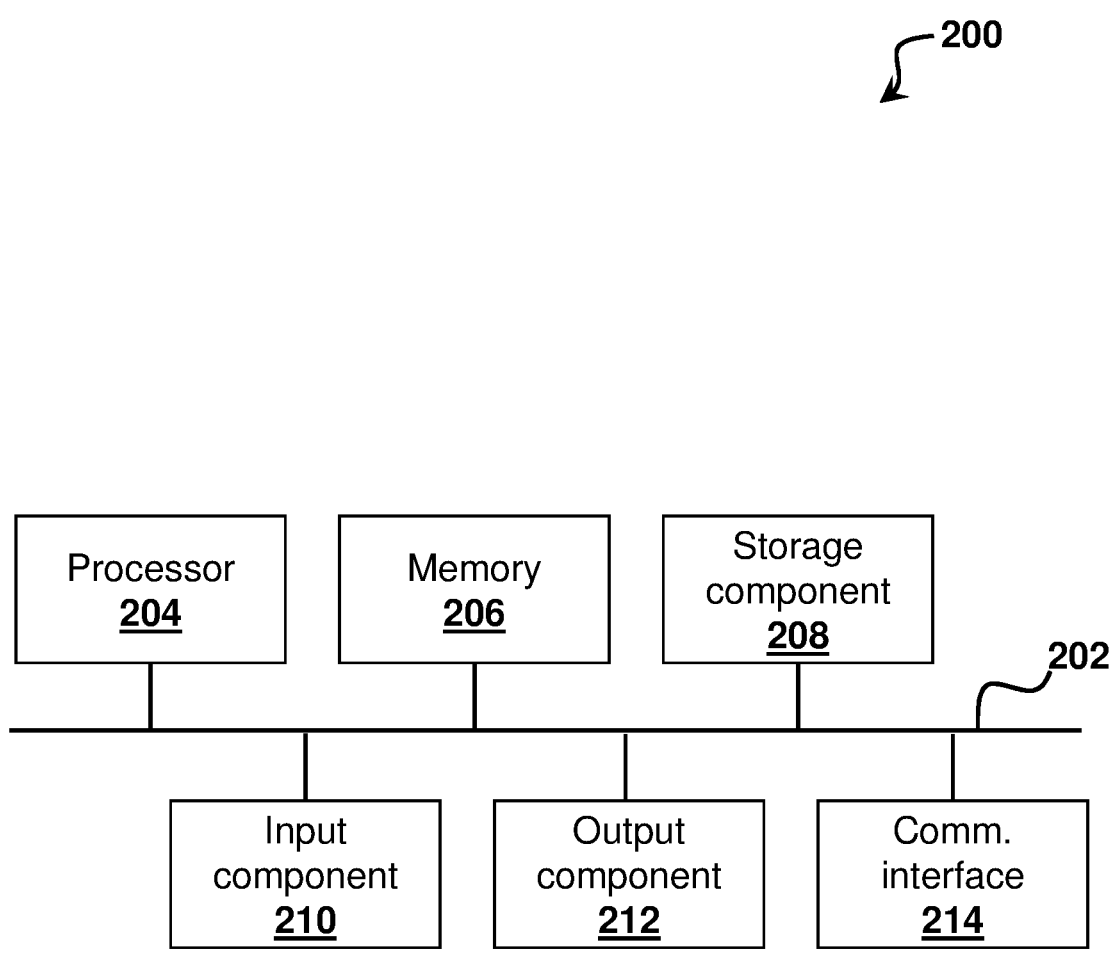
FIG. 2 is a diagram of a non-limiting embodiment or aspect of components of one or more devices of FIG. 1.

Referring now to FIG. 2, illustrated is a diagram of example components of device 200. Device 200 may correspond to one or more devices of a first computing device 102, a trusted execution environment (TEE) 104, one or more other computing devices 106, a shared ledger 108, and/or a communication network 110. In some non-limiting embodiments or aspects, one or more devices of the foregoing may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touchscreen display, a keyboard, a keypad, a mouse, a button, a switch, a microphone, a camera, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, and/or the like). Device 200 may be capable of receiving information from, storing information in, communicating information to, or searching information stored in the data storage or one or more data structures in memory 206 and/or storage component 208. For example, the information may include encryption data, input data, output data, transaction data, account data, or any combination thereof.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
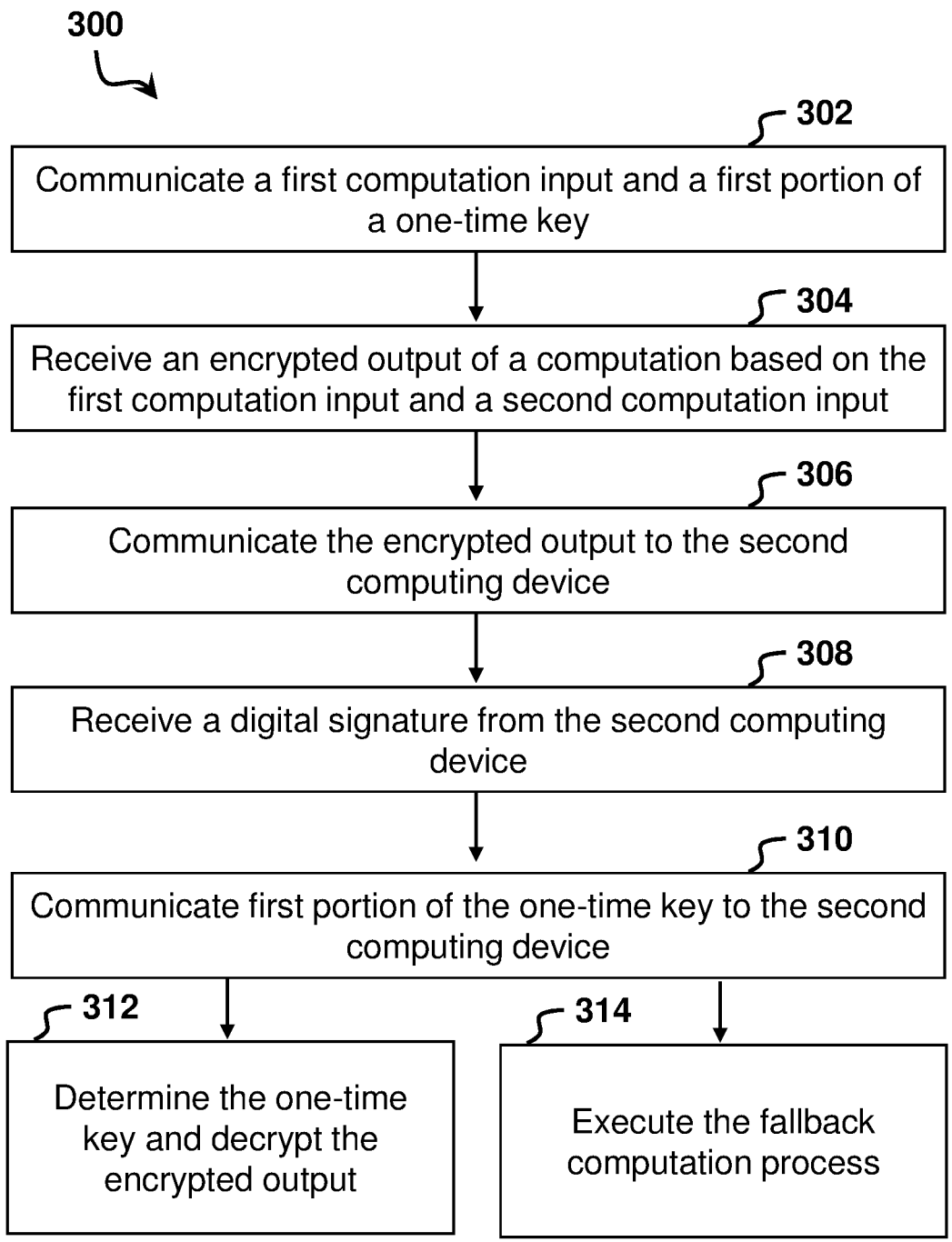
FIG. 3 is a flow diagram of a non-limiting embodiment or aspect of a method for secure real-time n-party computation.

Referring now to FIG. 3, provided is a method 300 for secure real-time n-party computation, according to non-limiting embodiments or aspects. The steps of method 300 may be executed by a first computing device 102, a TEE 104, and/or another computing device 106. One or more steps of method 300 may be executed by a same or different computing device as another step of method 300. While the steps of method 300 are described with respect to a two-party computation, it will be appreciated that the principles and steps may be expanded to, and applicable to, higher numbers of parties as described herein.

In step 302, a first computation input and a first portion of a one-time key may be communicated. For example, a first computing device 102 may communicate, to a TEE 104 associated with the first computing device 102, a first computation input and a first portion of a one-time key. Step 302 may be triggered in response to input by a first party user in an interface of the first computing device 102. Step 302 may be procedurally and sequentially required before proceeding to step 304.

In step 304, an encrypted output may be received. For example, first computing device 102 may receive, from the TEE 104, an encrypted output of a computation based on the first computation input and a second computation input. The second computation input and a second portion of the one-time key may be communicated to the TEE 104 by a second computing device (e.g., one of the other computing devices 106) preceding step 304. The encrypted output may be encrypted by the TEE 104 with the one-time key generated from the first portion of the one-time key and the second portion of the one-time key. Step 304 may be procedurally and sequentially required before proceeding to step 306.

In step 306, the encrypted output may be communicated to the second computing device. For example, first computing device 102 may communicate the encrypted output (received from the TEE 104 in step 304) to the second computing device. Step 306 may be triggered in response to input by a first party user in an interface of the first computing device 102. Step 306 may be procedurally and sequentially required before proceeding to step 308.

In step 308, a digital signature may be received from the second computing device. For example, the first computing device 102 may receive a digital signature from the second computing device indicating that the second computing device received the encrypted output in step 306. Step 308 may be procedurally and sequentially required before proceeding to step 310.

In step 310, the first portion of the one-time key may be communicated to the second computing device. For example, the first computing device 102 may communicate the first portion of the one-time key to the second computing device. If the second computing device sends its portion of the one-time key back in return, the first computing device 102 may proceed to determine the computation under a protocol where no fallback computation process is required (step 312). If the second computing device does not send its portion of the one-time key back in return, the first computing device 102 may proceed to determine the computation under a protocol where the fallback computation process is required (step 314). Step 310 may be procedurally and sequentially required before proceeding to step 312 or step 314.

In step 312, the one-time key may be determined and the encrypted output may be decrypted. For example, the first computing device 102 may, in response to receiving the second portion of the one-time key from the second computing device, determine the one-time key from the first portion of the one-time key and the second portion of the one-time key, and determine the computation by decrypting the encrypted output with the one-time key.

In step 314, the fallback computation process may be executed. For example, the first computing device 102 may, in response to not receiving the second portion of the one-time key from the second computing device, execute a fallback computation process using the TEE and a ledger accessible to both the first computing device 102 and the second computing device to determine the computation.

Figure 4:
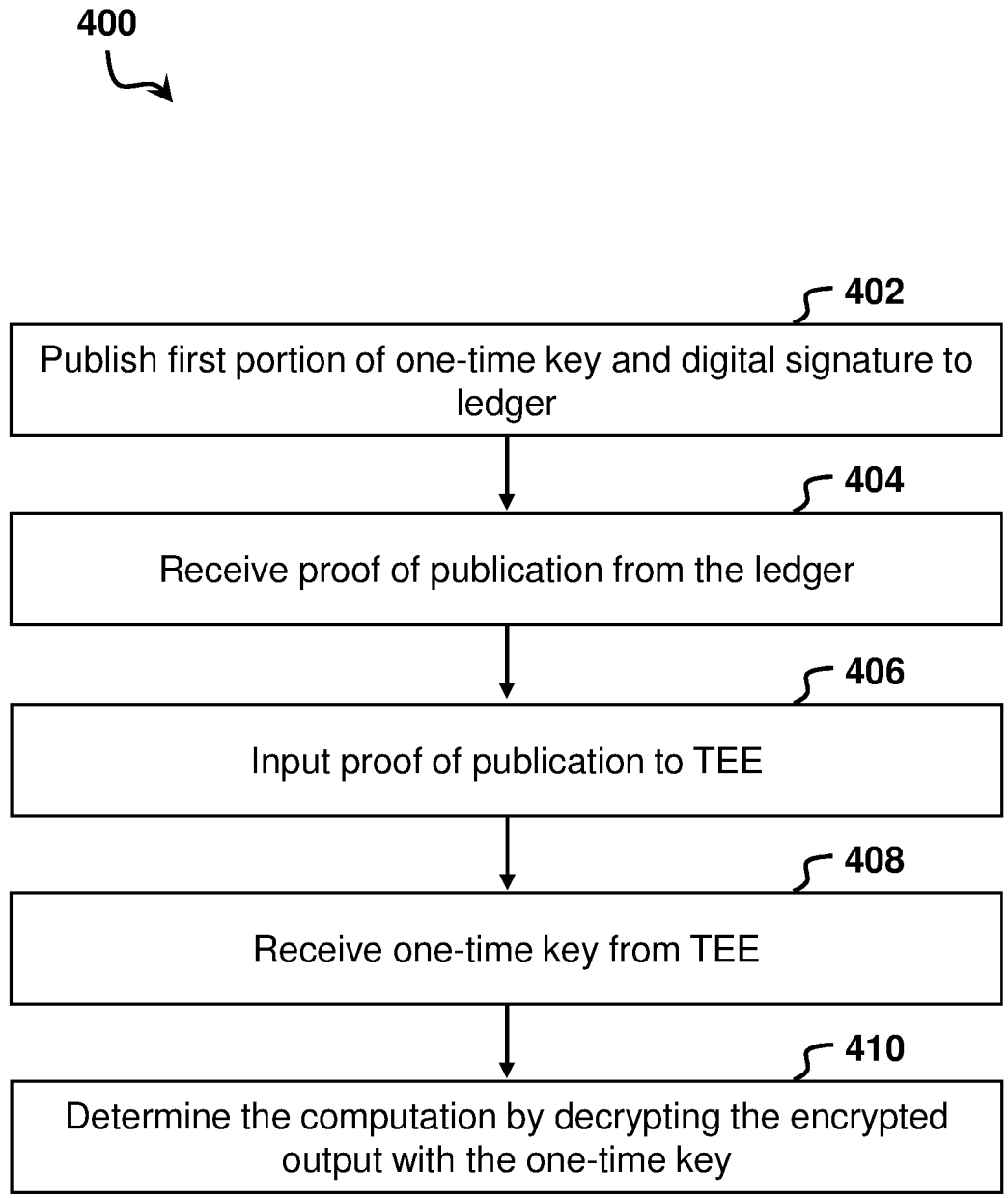
FIG. 4 is a flow diagram of a non-limiting embodiment or aspect of a method for secure real-time n-party computation.

Referring now to FIG. 4, provided is a method 400 for secure real-time n-party computation, according to non-limiting embodiments or aspects. The steps of method 400 may be executed by a first computing device 102, a TEE 104, and/or another computing device 106. One or more steps of method 400 may be executed by a same or different computing device as another step of method 400. While the steps of method 400 are described with respect to a two-party computation, it will be appreciated that the principles and steps may be expanded to, and applicable to, higher numbers of parties as described herein. It will further be appreciated that method 400 provides an illustrative fallback computation process for use in step 314 of FIG. 3.

In step 402, the first portion of the one-time key and digital signature may be published to the ledger 108. For example, first computing device 102 may publish the first portion of the one-time key and digital signature received from the second computing device to the ledger 108. Step 402 may be procedurally and sequentially required before proceeding to step 404.

In step 404, a proof of publication may be received. For example, first computing device 102 may receive a proof of publication from the ledger 108 indicative of the first portion of the one-time key and the digital signature being published to the ledger 108. Step 404 may be procedurally and sequentially required before proceeding to step 406.

In step 406, the proof of publication may be input to the TEE 104. For example, first computing device 102 may input the proof of publication to the TEE 104. This will indicate to the TEE 104 that the first portion of the one-time key and the digital signature were published to the ledger 108. Step 406 may be procedurally and sequentially required before proceeding to step 408.

In step 408, the one-time key may be received from the TEE 104. For example, first computing device 102, in response to inputting the proof of publication to the TEE 104, may receive the one-time key from the TEE 104. It will also be appreciated that the first computing device 102 may receive the second portion of the one-time key, by which the one-time key may be determined in combination with the first portion of the one-time key. Step 408 may be procedurally and sequentially required before proceeding to step 410.

In step 410, the computation may be determined. For example, first computing device 102 may determine the computation by decrypting the encrypted output with the one-time key. In this manner, despite the second computing device aborting the process early and not sending the second portion of the one-time key to the first computing device 102, the first computing device 102 has a means of retrieving the one-time key as a whole in a manner that also makes sure the second computing device has access to the first portion of the one-time key, should the second computing device's departure from the process been unintentional, e.g., due to an error.

Figure 5:
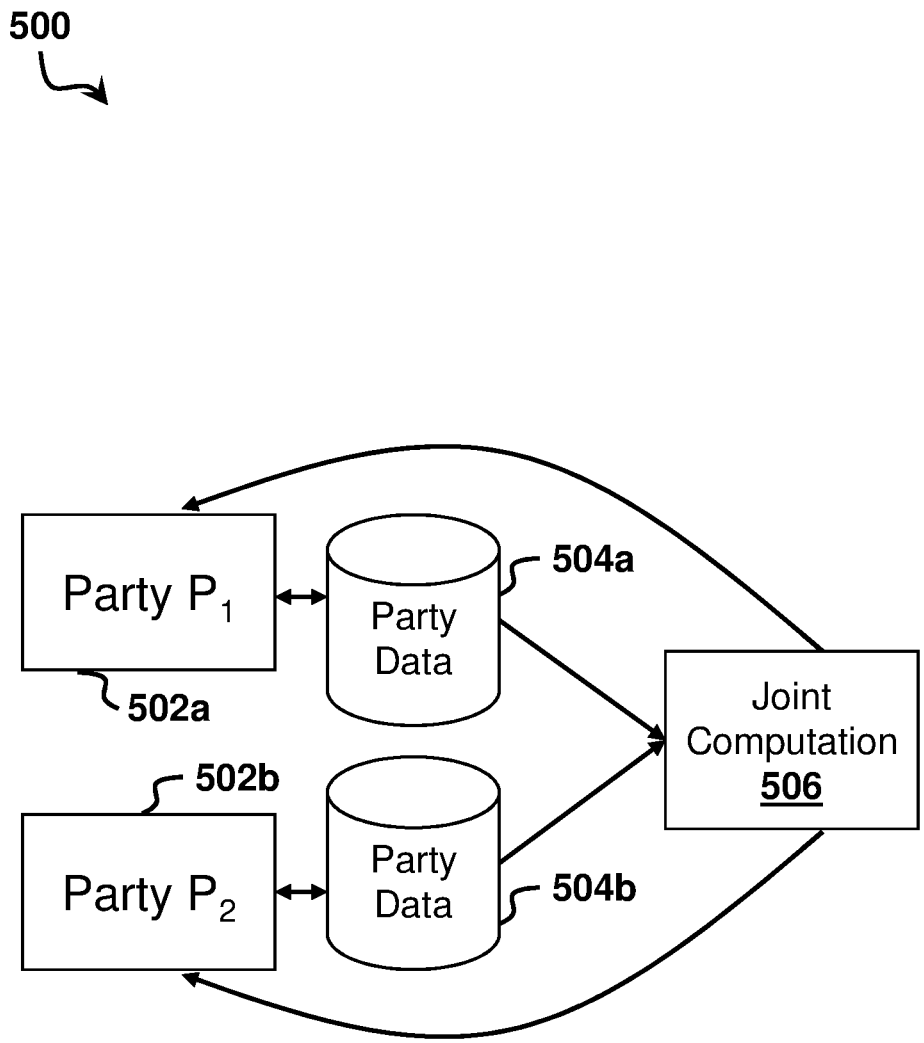
FIG. 5 is a schematic diagram of a non-limiting embodiment or aspect of a system for secure real-time n-party computation.

Referring to FIG. 5, depicted is a schematic diagram of a system 500 for secure, real-time, n-party computation, according to non-limiting embodiments or aspects. The system 500 of FIG. 5 depicts a multi-party computation of two parties: a first party ($P_1$) 502a and a second party ($P_2$) 502b. The above-described two-party protocol may be employed in the system 500, as shown. Each party 502a, 502b is associated with its own party data 504a, 504b, which may be stored on and communicated by respective computing devices. For example, the first party 502a possesses a first set of party data 504a on a first computing device, and the second party 502b possesses a second set of party data 504b on a second computing device. The parties 502a, 502b work together to complete a joint computation 506 by communicating their respective party data 504a, 504b for use in the joint computation 506, and to receive the output of the joint computation 506 in an order of operations that protects honest parties should a dishonest party break the protocol early.

Figure 6:
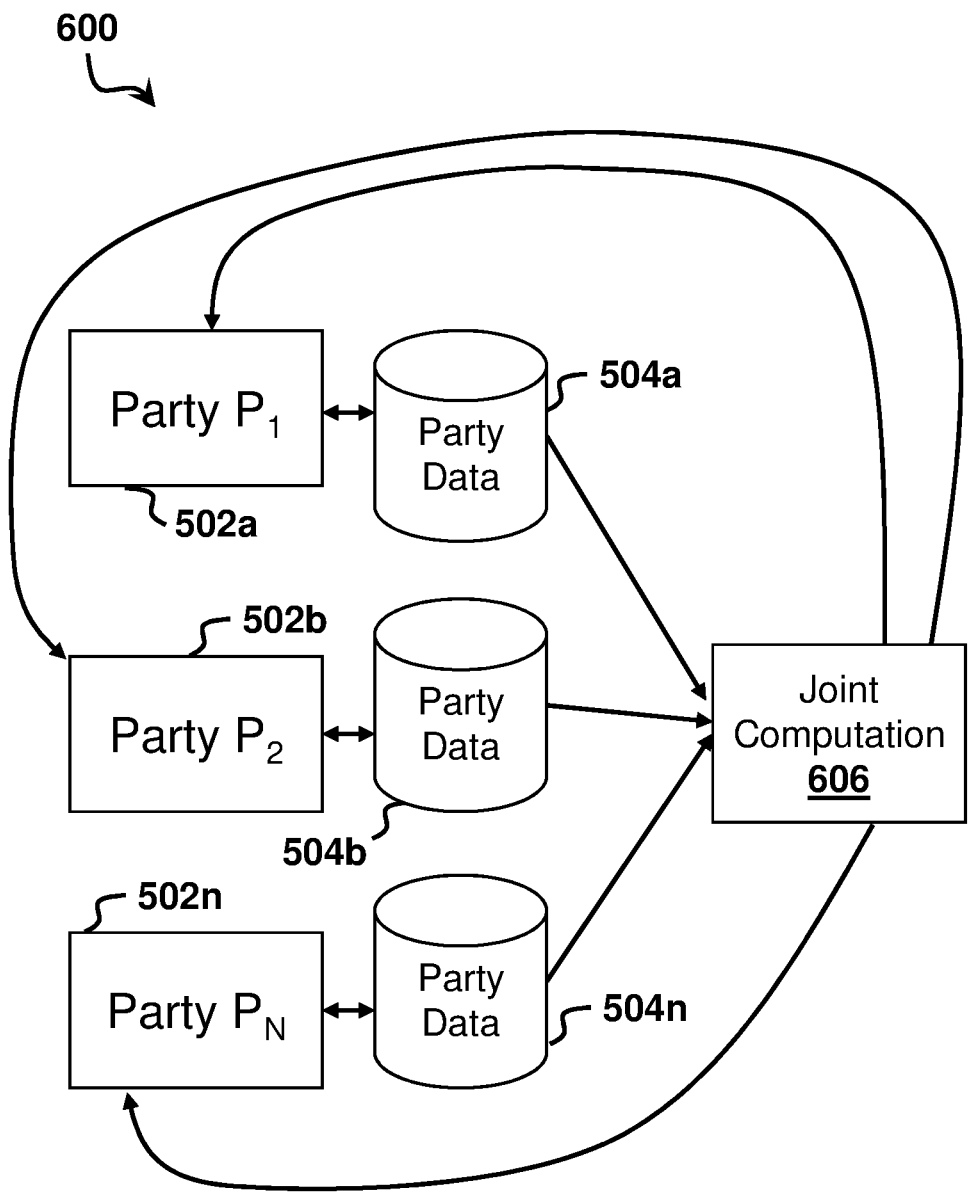
FIG. 6 is a schematic diagram of a non-limiting embodiment or aspect of a system for secure real-time n-party computation.

Referring to FIG. 6, depicted is a schematic diagram of a system 600 for secure, real-time, n-party computation, according to non-limiting embodiments or aspects. The system 600 of FIG. 6 depicts a multi-party computation of more than two parties: a first party ($P_1$) 502a, a second party ($P_2$) 502b, and any number of additional parties up to an nth party ($P_N$) 502n. The above-described n-party protocol may be employed in the system 600, as shown. Each party 502a, 502b, 502n is associated with its own party data 504a, 504b, 504n, which may be stored on and communicated by respective computing devices. For example, the first party 502a possesses a first set of party data 504a on a first computing device, the second party 502b possesses a second set of party data 504b on a second computing device, and any number of additional parties up to the nth party 502n may possess an nth set of party data 504n on an nth computing device. The parties 502a, 502b, 504n work together to complete a joint computation 606 by communicating their respective party data 504a, 504b, 504n for use in the joint computation 606, and to receive the output of the joint computation 606 in an order of operations that protects honest parties should a dishonest party break the protocol early.

Referring to FIG. 7, depicted is pseudocode for a method for secure real-time n-party computation, according to non-limiting embodiments or aspects. In particular, FIG. 7 depicts pseudocode for an enclave program for use in a two-party fair exchange protocol. The process depicted in FIG. 7 may be hosted and executed on a TEE 104.

Referring to FIGS. 8 and 9, depicted is pseudocode for a method for secure real-time n-party computation, according to non-limiting embodiments or aspects. In particular, FIGS. 8 and 9 depict pseudocode for a two-party fair exchange protocol. The process depicted in FIGS. 8 and 9 may be executed by one or more computing devices, including a first computing device 102 associated with a first party and at least one other computing device 106 (e.g., a second computing device) associated with a second party.

Referring to FIG. 10, depicted is pseudocode for a method for secure real-time n-party computation, according to non-limiting embodiments or aspects. In particular, FIG. 10 depicts pseudocode for an enclave program for use in an n-party fair exchange protocol. The process depicted in FIG. 10 may be hosted and executed on one or more TEE 104.

Referring to FIGS. 11 and 12, depicted is pseudocode for a method for secure real-time n-party computation, according to non-limiting embodiments or aspects. In particular, FIGS. 11 and 12 depict pseudocode for an n-party fair exchange protocol. The process depicted in FIGS. 11 and 12 may be executed by one or more computing devices, including a first computing device 102 associated with a first party and a plurality of other computing devices 106 associated with other parties.

Referring to FIGS. 13 and 14, depicted is pseudocode for a method for secure real-time n-party computation, according to non-limiting embodiments or aspects. In particular, FIGS. 13 and 14 depict pseudocode for an n-party fair exchange protocol for a setting including multiple ledgers 108. The process depicted in FIGS. 13 and 14 may be executed by one or more computing devices, including a first computing device 102 associated with a first party and a plurality of other computing devices 106 associated with other parties.

Referring to FIG. 15, depicted is pseudocode for a method for secure real-time n-party computation, according to non-limiting embodiments or aspects. In particular, FIG. 15 depicts pseudocode for an enclave program for use in an n-party fair coin tossing protocol. The process depicted in FIG. 15 may be hosted and executed on one or more TEE 104.

Referring to FIGS. 16 and 17, depicted is pseudocode for a method for secure real-time n-party computation, according to non-limiting embodiments or aspects. In particular, FIGS. 16 and 17 depict pseudocode for an n-party fair coin tossing protocol. The process depicted in FIGS. 16 and 17 may be executed by one or more computing devices, including a first computing device 102 associated with a first party and a plurality of other computing devices 106 associated with other parties.

Although the disclosure has been described in detail for the purpose of illustration based on what is currently considered to be the most practical and non-limiting embodiments or aspects, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A system comprising:
a trusted execution environment (TEE) programmed or configured to:
receive, from a first computer device associated with a first party, a first computation input and a first portion of a one-time key;
receive, from a second computer device associated with a second party, a second computation input and a second portion of the one-time key;
generate the one-time key based on the first portion of the one-time key and the second portion of the one-time key;
execute a computation based on the first computation input and the second computation input;
generate an encrypted output by encrypting the computation with the one-time key;
communicate the encrypted output to the first computer device;
receive a proof of publication from the first computer device, the proof of publication indicating that the following were published on a ledger accessible to the first computer device and the second computer device: (i) the first portion of the one-time key; and (ii) a digital signature of the second computer device indicating that the second computer device received the encrypted output; and
in response to receiving the proof of publication, communicate the one-time key to the first computer device.

2. The system of claim 1, wherein, when generating the one-time key, the TEE is programmed or configured to:
generate the one-time key based on the first portion of the one-time key, the second portion of the one-time key, and a unique nonce associated with an instance of the computation.

3. The system of claim 2, wherein the first portion of the one-time key is generated from a private key associated with the first computer device, and wherein the second portion of the one-time key is generated from a private key associated with the second computer device.

4. The system of claim 3, wherein, when receiving the first portion of the one-time key and the second portion of the one-time key, the TEE is programmed or configured to:

receive the first portion of the one-time key and the second portion of the one-time key in a first time period; and wherein the TEE is further programmed or configured to:
generate a plurality of one-time keys over successive instances of multi-party computation in time periods subsequent the first time period.

5. The system of claim 1, wherein the TEE is further programmed or configured to:
receive, from a third computer device associated with a third party, a third computation input and a third portion of the one-time key; and
wherein, when generating the one-time key, the TEE is programmed or configured to:
generate the one-time key based on the first portion of the one-time key, the second portion of the one-time key, and the third portion of the one-time key.

6. The system of claim 5, wherein, when executing the computation, the TEE is programmed or configured to:
execute the computation based on the first computation input, the second computation input, and the third computation input; and
wherein the proof of publication further indicates that a digital signature of the third computer device was published on the ledger, the digital signature of the third computer device indicating that the third computer device received the encrypted output.

7. The system of claim 6, wherein the third portion of the one-time key is generated from a private key associated with the third computer device.

8. A computer program product stored on a trusted execution environment (TEE) and comprising at least one non-transitory computer-readable medium including program instructions that, when executed by at least one processor of the TEE, cause the at least one processor to:
receive, from a first computer device associated with a first party, a first computation input and a first portion of a one-time key;
receive, from a second computer device associated with a second party, a second computation input and a second portion of the one-time key;
generate the one-time key based on the first portion of the one-time key and the second portion of the one-time key;
execute a computation based on the first computation input and the second computation input;
generate an encrypted output by encrypting the computation with the one-time key;
communicate the encrypted output to the first computer device;
receive a proof of publication from the first computer device, the proof of publication indicating that the following were published on a ledger accessible to the first computer device and the second computer device: (i) the first portion of the one-time key; and (ii) a digital signature of the second computer device indicating that the second computer device received the encrypted output; and
in response to receiving the proof of publication, communicate the one-time key to the first computer device.

9. The computer program product of claim 8, wherein the program instructions that cause the at least one processor to generate the one-time key cause the at least one processor to:
generate the one-time key based on the first portion of the one-time key, the second portion of the one-time key, and a unique nonce associated with an instance of the computation.

10. The computer program product of claim 9, wherein the first portion of the one-time key is generated from a private key associated with the first computer device, and wherein the second portion of the one-time key is generated from a private key associated with the second computer device.

11. The computer program product of claim 10, wherein the program instructions that cause the at least one processor to receive the first portion of the one-time key and the second portion of the one-time key cause the at least one processor to:
receive the first portion of the one-time key and the second portion of the one-time key in a first time period; and
wherein the program instructions further cause the at least one processor to:
generate a plurality of one-time keys over successive instances of multi-party computation in time periods subsequent the first time period.

12. The computer program product of claim 8, wherein the program instructions further cause the at least one processor to:
receive, from a third computer device associated with a third party, a third computation input and a third portion of the one-time key; and
wherein the program instructions that cause the at least one processor to generate the one-time key cause the at least one processor to:
generate the one-time key based on the first portion of the one-time key, the second portion of the one-time key, and the third portion of the one-time key.

13. The computer program product of claim 12, wherein the program instructions that cause the at least one processor to execute the computation cause the at least one processor to:
execute the computation based on the first computation input, the second computation input, and the third computation input; and
wherein the proof of publication further indicates that a digital signature of the third computer device was published on the ledger, the digital signature of the third computer device indicating that the third computer device received the encrypted output.

14. The computer program product of claim 13, wherein the third portion of the one-time key is generated from a private key associated with the third computer device.

15. A computer-implemented method comprising:
receiving, with at least one processor of a trusted execution environment (TEE), a first computation input and a first portion of a one-time key from a first computer device associated with a first party;
receiving, with at least one processor of the TEE, a second computation input and a second portion of the one-time key from a second computer device associated with a second party;
generating, with at least one processor of the TEE, the one-time key based on the first portion of the one-time key and the second portion of the one-time key;
executing, with at least one processor of the TEE, a computation based on the first computation input and the second computation input;
generating, with at least one processor of the TEE, an encrypted output by encrypting the computation with the one-time key;
communicating, with at least one processor of the TEE, the encrypted output to the first computer device;

receiving, with at least one processor of the TEE, a proof of publication from the first computer device, the proof of publication indicating that the following were published on a ledger accessible to the first computer device and the second computer device: (i) the first portion of the one-time key; and (ii) a digital signature of the second computer device indicating that the second computer device received the encrypted output; and in response to receiving the proof of publication, communicating, with at least one processor of the TEE, the one-time key to the first computer device.

16. The method of claim 15, wherein generating the one-time key further comprises:

generating the one-time key based on the first portion of the one-time key, the second portion of the one-time key, and a unique nonce associated with an instance of the computation.

17. The method of claim 16, wherein the first portion of the one-time key is generated from a private key associated with the first computer device, and wherein the second portion of the one-time key is generated from a private key associated with the second computer device.

18. The method of claim 17, wherein receiving the first portion of the one-time key and the second portion of the one-time key further comprises:

receiving the first portion of the one-time key and the second portion of the one-time key in a first time period; and wherein the method further comprises:

generating, with at least one processor of the TEE, a plurality of one-time keys over successive instances of multi-party computation in time periods subsequent the first time period.

19. The method of claim 15, further comprising:

receiving, with at least one processor of the TEE, a third computation input and a third portion of the one-time key from a third computer device associated with a third party; and wherein generating the one-time key further comprises:

generating the one-time key based on the first portion of the one-time key, the second portion of the one-time key, and the third portion of the one-time key.

20. The method of claim 19, wherein the third portion of the one-time key is generated from a private key associated with the third computer device, wherein executing the computation further comprises:

executing the computation based on the first computation input, the second computation input, and the third computation input; and wherein the proof of publication further indicates that a digital signature of the third computer device was published on the ledger, the digital signature of the third computer device indicating that the third computer device received the encrypted output.

\* \* \* \* \*